United States Patent [19]
Hockaday

[11] Patent Number: 5,759,712
[45] Date of Patent: Jun. 2, 1998

[54] SURFACE REPLICA FUEL CELL FOR MICRO FUEL CELL ELECTRICAL POWER PACK

[76] Inventor: Robert G. Hockaday, 3025 Arizona Ave., Los Alamos, N. Mex. 87544

[21] Appl. No.: 779,106

[22] Filed: Jan. 6, 1997

[51] Int. Cl.[6] .................................................. H01M 8/10
[52] U.S. Cl. ............................. 429/30; 429/35; 429/42; 429/26
[58] Field of Search ........................... 429/19, 26, 30, 429/34, 35, 40, 42

[56] References Cited

U.S. PATENT DOCUMENTS

| | | |
|---|---|---|
| 4,138,510 | 2/1979 | Koziol et al. . |
| 4,243,508 | 1/1981 | Dankese . |
| 4,252,868 | 2/1981 | Bohm et al. . |
| 4,421,579 | 12/1983 | Covitch et al. . |
| 4,623,415 | 11/1986 | Kahara et al. . |
| 4,661,423 | 4/1987 | Ueno et al. . |
| 4,666,579 | 5/1987 | Beaver et al. . |
| 4,673,624 | 6/1987 | Hockaday . |
| 4,769,297 | 9/1988 | Reiser et al. . |
| 4,793,910 | 12/1988 | Smotkin et al. . |
| 4,804,449 | 2/1989 | Sweeney . |
| 4,818,637 | 4/1989 | Molter et al. . |
| 4,824,741 | 4/1989 | Kunz . |
| 4,826,554 | 5/1989 | McIntyre et al. . |
| 4,865,925 | 9/1989 | Ludwig et al. . |
| 4,931,168 | 6/1990 | Watanabe et al. . |
| 5,084,144 | 1/1992 | Reddy et al. . |
| 5,108,849 | 4/1992 | Watkins et al. . |
| 5,173,166 | 12/1992 | Tomantschger et al. . |
| 5,187,025 | 2/1993 | Kelland et al. . |
| 5,234,777 | 8/1993 | Wilson . |
| 5,240,786 | 8/1993 | Ong et al. . |
| 5,242,764 | 9/1993 | Dhar . |
| 5,252,410 | 10/1993 | Wilkinson et al. . |
| 5,262,250 | 11/1993 | Watanabe . |
| 5,264,299 | 11/1993 | Krasij et al. . |
| 5,266,421 | 11/1993 | Townsend et al. . |
| 5,290,323 | 3/1994 | Okuyama et al. . |
| 5,316,871 | 5/1994 | Swathirajan et al. . |
| 5,364,711 | 11/1994 | Yamada et al. . |
| 5,432,023 | 7/1995 | Yamada et al. . |
| 5,453,331 | 9/1995 | Bloom et al. . |
| 5,472,799 | 12/1995 | Watanabe . |
| 5,482,568 | 1/1996 | Hockaday . |

FOREIGN PATENT DOCUMENTS

| | | |
|---|---|---|
| 239169 | 9/1987 | European Pat. Off. . |
| 60-33284 | 2/1985 | Japan . |
| 874283 | 8/1961 | United Kingdom . |
| 2139110 | 11/1984 | United Kingdom . |
| 2268619 | 1/1994 | United Kingdom . |

OTHER PUBLICATIONS

Vielstich et al., "Fuel Cells", Wiley–Interscience, London, NY, Sydney, Toronto (1970).

Vielstich et al., "Proton Exchange . . . ", Symposium on Batteries and Fuel Cells . . . , Honolulu, Hawaii, pp. 268–280 (1993). No Month.

Abbott et al., "Manipulation of the Wettability of Surfaces . . . ", Science, vol. 257, pp. 1388–1382 (Sep. 4, 1992).

(List continued on next page.)

*Primary Examiner*—Anthony Skapars
*Attorney, Agent, or Firm*—James Creighton Wray; Meera P. Narasimhan

[57] ABSTRACT

A miniature fuel cell system uses porous plastic membranes as substrates of fuel cells. A cost effective pore-free electrode or inter electrolyte foil that is permeable only to hydrogen as an ion. The new electrode makes direct alcohol fuel cells efficient. It blocks the poisoning alcohol diffusion through the electrolyte. Compound electrodes are formed by vacuum deposition methods and slurries. That leads to printed circuit designs of small fuel cells systems integrated with rechargeable batteries and electrical power electronics to power applications that are currently powered by batteries. By directly utilizing alcohol fuels the new fuel cells have higher energy per unit mass and higher energy per unit volume. They are more convenient for the energy user, environmentally less harmful and less expensive than conventional batteries.

53 Claims, 10 Drawing Sheets

OTHER PUBLICATIONS

J.S. Batzold, "Thin Film Fuel Cell Electrodes", in *From Electrocatalysts To Fuel Cells*, Univ. of Washington PRess, pp. 224–229 (Jun. 8, 1972).

Cahan, "The Mechanism of Electrodic Reactions of Porous Surfaces", Ph.D. Dissertation (1968). No Month.

Robert G. Hockaday, "Development & Modeling of the Homporous . . . ", Masters Thesis, N.M. State Univsity (Dec. 1984).

Joyce et al., "Composite Ion Exchange Membranes . . . ", Abstract of Oral Presentation, Journal of Elec. Sty., vol. 135 #3, p. 139 C (Mar. 1988).

Naylor et al., "A Novel Anode System . . . ", 1992 Fuel Cell Seminar, Tucson, AZ, pp. 575–578 (Nov. 29 –Dec. 2, 1992).

Sarangapani et al., "Advanced Corrosion–Resistant Coatings . . . ", 1992 Fuel Cell Seminar, Tucson, AZ, pp. 167–170. No Month.

Srinivasan et al., "Fundamental Equations . . . ", J. Chem. Phs., vol. 46, pp. 3108–3122 (Apr. 15, 1967).

Fang et al., "Surface Diffusion in Microstructured . . . ", Journal of Physical Chemistry, vol. 99, pp. 6064–6073 (1995). No Month.

Gupta et al., "Proton Exchange Membranes . . . ", Chimia 48, pp. 127–137 (1994). No Month.

Narayanan et al., "Electrochemical Characterizations . . . ", 1992 Fuel Cell Seminar Tucson, AZ, pp. 233–236 (Nov. 29 –Dec. 2, 1992).

Riezenman M., "The Search for Better Batteries", IEEE Spectrum, pp. 51–56 (May 1995).

Rota et al., "Membrane Development of PEFC at PSE", Abstract of Papers, 187th Meeting of Electrochemical Sty, Reno, NV (1995). No Month.

Surampudi et al., "Advances in Direct Oxydation . . . ", Space Electroch. Res. & Techn. Proc., NASA Lewis RC, Cleveland, OH, pp. 181–191 (Apr./14–15, 1993).

Cong Pu et al., "A Methanol Impermeable Proton Conducting Composite . . . ", J. Electrochem. Soc., vol. 142, No. 7 (Jul. 1995).

Pyun et al., "Investigation of the Hydrogen Evolution . . . ", J. APP. Electrochemistry, pp. 953–958 (1996). No Month.

Hasler et al., "A Novel Pd–Ag Membrane Anode . . . ", J. Power Sources, pp. 93–103 (1993). No Month.

Blomen et al., "Fuel Cell Systems", Plenum Press, New York and London, pp. 68–69 (1993). No Month.

Bloomfield et al., "Fuel Cells for Space Marine . . . ", 1992 Fuel Cell Seminar, Tucson, Arizona, pp. 387–390 (Nov. 29 –Dec. 2, 1992).

Derouin et al., "Recent Achievements in Polymer Electrolyte . . . ", 1992 Fuel Cell Seminar, Tucson, AZ, pp. 615–618 (Nov. 29 –Dec. 2, 1992).

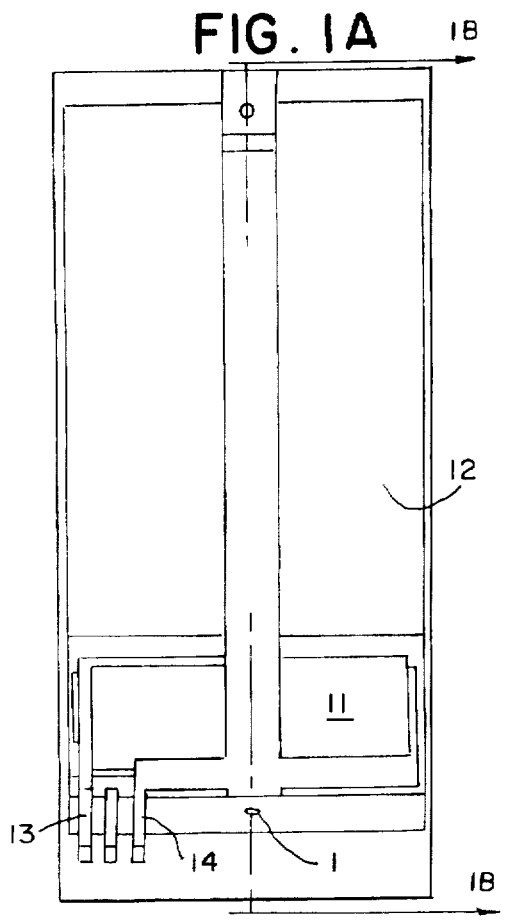
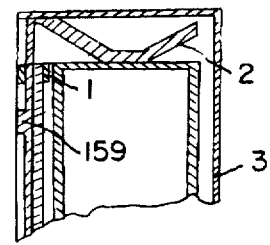
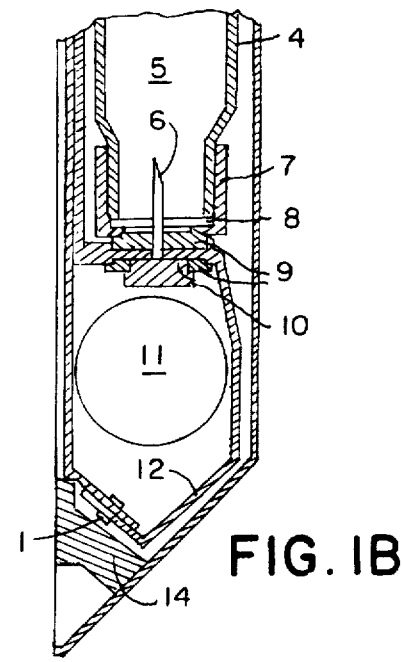
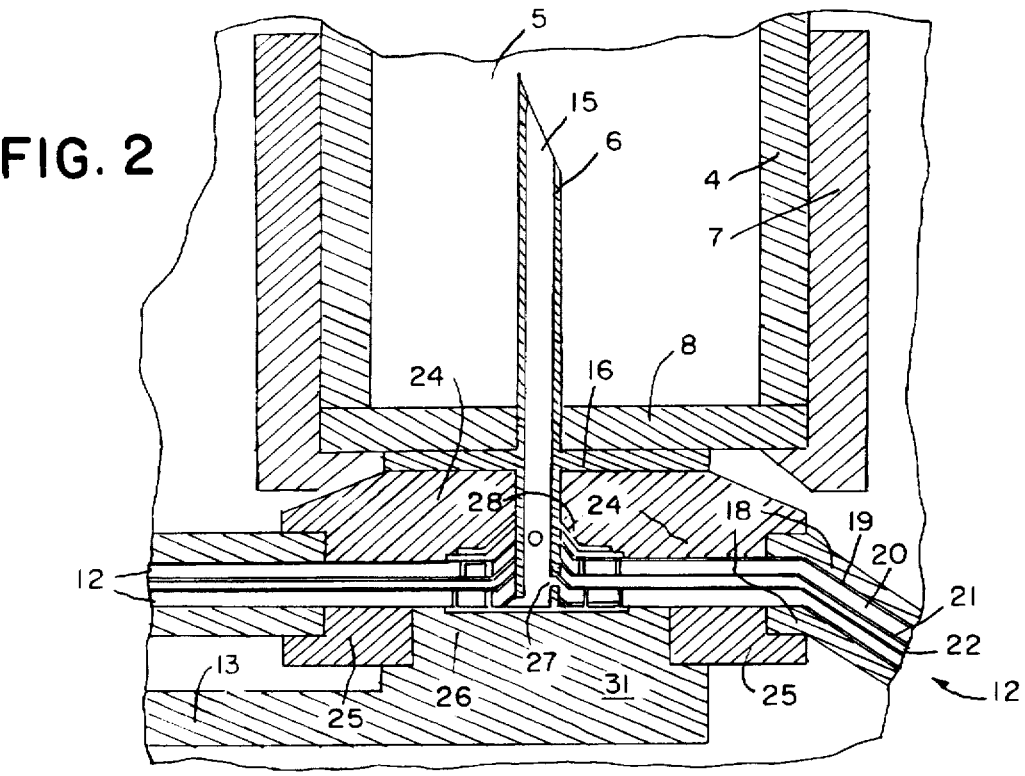
FIG. 1A
FIG. 1B
FIG. 2

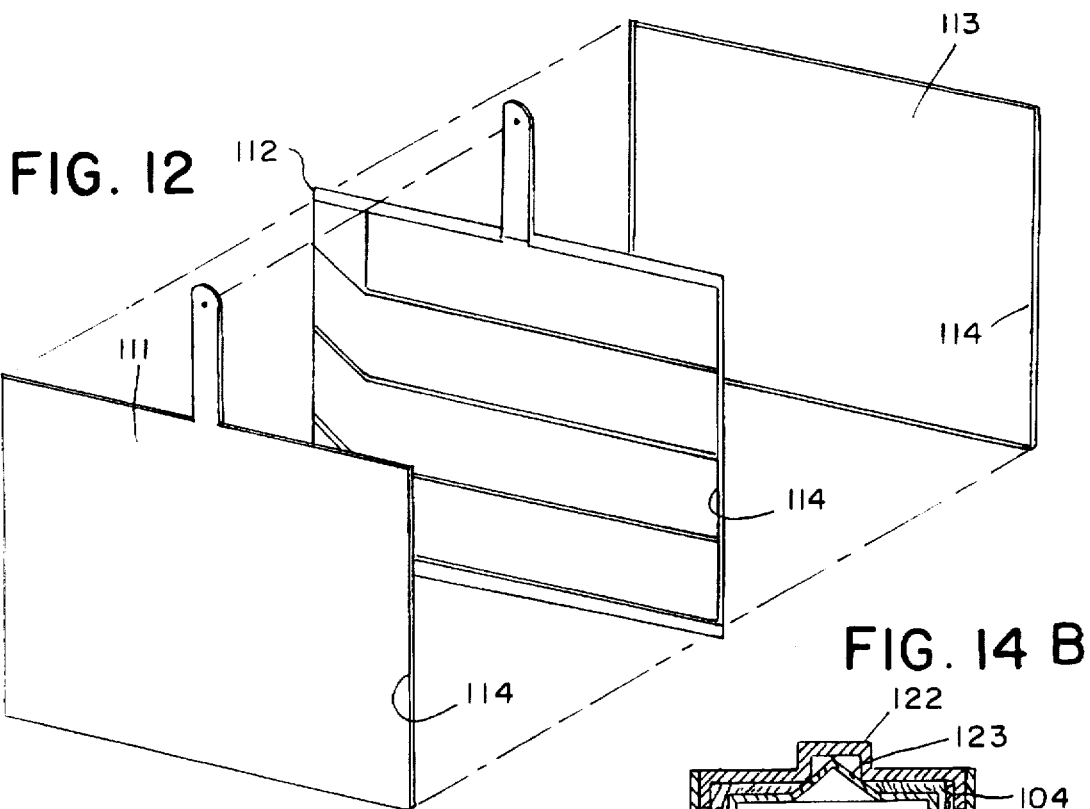
FIG. 12
FIG. 14 B
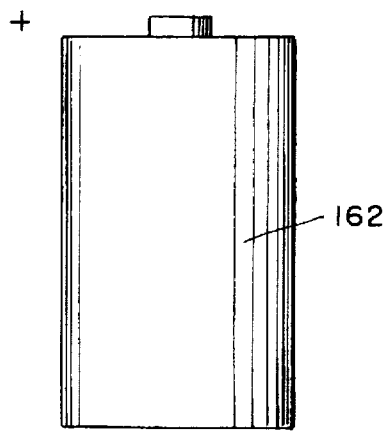
FIG. 14 A
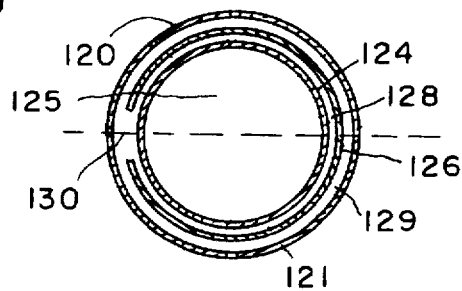
FIG. 14 C

SURFACE REPLICA FUEL CELL FOR MICRO FUEL CELL ELECTRICAL POWER PACK

BACKGROUND OF THE INVENTION

Fuel cells transform chemical energy to electrical energy by reacting gas or liquids in the presence of an electrolyte, electrodes and a catalyst. The previous U.S. Pat. No. 4,673,624 and Replica Fuel Cell U.S. patent application Ser. No. 08/531,378 , now U.S. Pat. No. 5,631,099 describe methods of forming fuel cells that efficiently use expensive catalysts and are easily mass produced. Recent advances in electro-catalysts have produced catalysts that work directly and efficiently with alcohol fuels. Small compact fuel cell system designs are now economically feasible.

U.S. Pat. Nos. 5,364,711 and 5,432,023 describe miniature fuel cells to run "OA (Office Automation) equipment, audio equipment, and radio equipment". Those patents describe advantages of using miniature fuel cells and a conglomeration of techniques to build fuel cells. Essentially, the two patents use a wick to introduce liquid fuel and electrolyte to the fuel cell and remove excess water from the fuel. There are four fundamental problems of the wicking of input fuel and water in low power fuel cells. The first is in delivering the methanol fuel to the fuel cell as solution of sulfuric acid and methanol runs the risk of shorting non-bipolar cells in a single membrane type fuel cell. The second problem is that in low power per unit area operation and in low humidity environments there is often a problem of water retention and re-use in the fuel cell rather than water removal. Although the water removal wicking system may be useful in stabilizing the water content around the fuel cell electrodes, it removes excess water only when it is in excess. In low power applications retaining water and maintaining water balance in the electrolyte is the problem, not removing it. In addition, a mechanism for moving condensed water from the porous gas electrode to the wick is not described. A wicking system alone will not be able to pull the water away, unless there is physical contact with the liquid water or some other mechanism of transporting the water vapor out of the microstructure of the fuel cell to the wicking surface. Conventional gas diffusion electrodes pack the electrodes with hydrophobic materials.

U.S. patent application Ser. No. 08/531,378 describes a vapor phase transport to a hydrophilic outer surface of a gas manifold. Also in U.S. patent application Ser. No. 08/531,378 surface tension gradients are used to induce condensed water to migrate to desirable locations. The third problem is that the assemblies described in U.S. Pat. No. 5,364,711 and U.S. Pat. No. 5,432,023 show a system of many separate parts mechanically put together. Complex assembly does not lend itself to mass production. The fourth problem is that the methanol fuel cross-over through the proton conductive electrolyte cannot be addressed adequately, to reach reasonable fuel efficiencies for low power operation with a homogenous electrolyte and porous electrodes.

In U.S. Pat. No. 4,931,168 a gas permeable electrode is in contact with a methanol fuel. Its purpose is to prevent carbon dioxide bubble build up on the fuel cell electrode. A gas permeable resin and catalytic particle electrodes allow reactants and ions to move in and out of the electrodes. The gas permeable membrane does not provide a means of blocking methanol fuel crossover.

It is desirable to use fuel cells for small appliances. H-Power Corporation is working with Analytic Power Corporation to produce a 25 watt power fuel cell to drive video recorders. Pressurized metal hydride hydrogen cylinders or decomposing hydrides were expected to be used as fuel supply.

Disadvantages are that those fuel cells are bipolar stacked cells and the fuel supply is not convenient. Bipolar fuel cell stacks are expensive to assemble and require electrically conductive porous gas cell separators. Stacking the cells requires extra labor. There are usually at least four gas tight seals for every electrical cell and two gas volumes in a series stack. For small applications such as for the cellular phone a 6 volt output is required, and each individual fuel cell may average 0.5 volts. That translates into 48 gas seals between non similar materials. The electrical contact via mechanical contact in the humid environment of the cell results in significant corrosion and wear problems. Costs of components are driven up by the mass of expensive materials needed to form the cells.

New parameters are opened up for fuel cells with the advent of new binary catalysts such as Pt/Ru for direct electrocatalysis of methanol at room temperatures. Directly fueled fuel cells that run high energy density socially acceptable fuels are possible. If fuel cells can run at room temperature and pressures, then there is no thermal or complexity scale factor that constrains the dimensions or power sizes of the fuel cells. The next step in the evolution is to reduce the catalyst costs and simplify the fuel cell assembly to be cost effective.

SUMMARY OF THE INVENTION

The present invention uses the fuel cells described in U.S. Pat. No. 4,673,624 and in co-pending Surface Replica Fuel Cell U.S.patent application Ser. No. 08/531,378 to form a small electrical power supply, with or without an electrical storage device such as a rechargeable battery, with the objective of providing electrical power for portable electronics. Output power conditioning devices may be incorporated with the fuel cell to allow the cell to deliver a desired electrical output. Electronics controls regulate the DC voltage output, use electronic switching to deliver a constant voltage while dropping the voltage on the fuel cell for higher currents, or deliver an arbitrary AC wave form power current and periodically electrically activate the fuel cell catalysts. That assembly is packaged in a container to protect it, and to fit it into the application. Fuel and electrical connections to the fuel cell may be reduced to two connections. In the following assembly, the electrical connections are separated to make the electrode patterns simpler and to avoid any high voltage tension areas in the cells. The gas connection is a compression fitting (rivet, ratchet, or nut and bolt connection). That permits the fuel cells to be easily assembled in mass production.

The new fuel cell with non-bipolar stacking eliminates previous fuel cell problems and drops the total number of seals down to two or three. The number of mechanical contacts are two or three, and they may be kept away from the humid environment. For the small appliance market it is critical that the new fuel cell design permit the cells to be assembled quickly and to perform repeatably.

Other features of the new invention are that, because the Surface Replica Fuel Cells are a flexible membrane package, they may be wrapped around in the protective container. The fuel cells may be corrugated to pack the cells into compact volumes, while still retaining air flow channels. The fuel cells may be packaged into standard battery physical profiles to fit many applications designed for batteries.

For large power applications the cells may be stacked along a common power and gas supply tube. As in the smaller cells, the electrical and fuel connections may be in common.

For higher power applications, where it is advantageous to run the fuel cells at elevated temperatures and actively flow the oxidizer air, the new invention uses a water and heat counter flow exchanger to maintain the temperature of the fuel cell and the high humidity while exchanging gas from cooler fuel or oxidizer gas supply. Heat and water are exchanged across membranes in the heat exchanger. The membranes may be porous membranes impregnated with solid polymer electrolytes or similarly water permeable membranes. By impregnating mechanically strong porous membranes as compared to the typically low mechanical strength permeable material the strength and utilization of the permeable materials is improved over simply using a homogenous membrane of the permeable material.

In the microstructure of the fuel cell there are a number of new variations; the fuel cell electrodes may be made in layers, and a distinct inner electrode layer may be used to separate the electrolyte and to prevent electrolyte-crossing reactant or product diffusion. A pore-free hydrogen-only permeable metallic membrane may be formed by plugging the small pores of the plastic substrates with a thin film deposited metal. That membrane may be incorporated into the fuel cell as an electrode or may be used separately in the electrolyte.

A simplified assembly may be formed by masking the electrode patterns when they are deposited, and ion milling may be used to clean off the gaps between the fuel cells. The array of fuel cells may be assembled by folding an array of fuel cells in which both the cell interconnection routes, cell breaks, and fuel and oxidizer electrodes are made on one side of a membrane.

The fuel cell runs on concentrated methanol and air by using pore free membrane electrodes with unique characteristics. The pore free membrane electrodes being tested for their diffusion properties have very unique characteristics of sealing themselves to oxygen and inert gases when they are hydrated with hydrogen. The thin Pd films have small voids in them due to sputtered film deposition morphology. It is postulated that when the hydration occurs the palladium swells and fills the small voids. That sealing characteristic was also observed when the palladium//platinum/palladium membrane was hydrated for 21 hours with argon gas being on the opposite side of the membrane. The hydrogen diffusion also dropped to 17% of the starting diffusion rate. The original high diffusion rates were recovered after exposure to air and oxygen. A theory is that hydrocarbons from the tubing in the system, along with void closure, were poisoning the palladium catalytic sites.

The features of the semi-permeable membrane electrode have critical differences from other fuel cells.

A miniature fuel cell system uses porous plastic membranes as substrates of fuel cells. A cost effective pore-free electrode or inter electrolyte foil that is permeable only to hydrogen as an ion. The new electrode makes direct alcohol fuel cells efficient. It blocks the poisoning alcohol diffusion through the electrolyte. Compound electrodes are formed by vacuum deposition methods and slurries. That leads to printed circuit designs of small fuel cells systems integrated with rechargeable batteries and electrical power electronics to power applications that are currently powered by batteries. By directly utilizing alcohol fuels the new fuel cells have higher energy per unit mass and higher energy per unit volume. They are more convenient for the energy user, environmentally less harmful and less expensive than conventional batteries.

The subject of the present application is to add on the advances that have occurred in the Replica Fuel Cell since the last application and to describe many of the novel applications of the Replica Fuel Cell. A critical new advance is the further development of a cost effective pore-free electrode that is only permeable to hydrogen as an ion. That in turn increases the efficiency and practicality of direct alcohol fuel cells because it blocks the poisoning alcohol diffusion through the electrolyte. Making small alcohol powered fuel cells practical.

The most obvious applications of a small fuel cell are in those that are currently powered by batteries, and especially the rechargeable batteries. By directly utilizing alcohol fuels the fuel cells have higher energy per unit mass, higher energy per unit volume, be more convenient for the energy user, environmentally less harmful, and less expensive than conventional batteries.

These and further and other objects and features of the invention are apparent in the disclosure, which includes the above and ongoing written specification, with the claims and the drawings.

BRIEF DESCRIPTION OF THE DRAWINGS

FIGS. 1A and 1B are front and side sectional views of a fuel cell configured to power a cellular phone with a rechargeable battery. FIG. 1A is an interior cellular phone view. FIG. 1B is a centerline cross section.

FIG. 2 is an enlarged cross sectional view of the needle-fuel connection in the cell shown in FIG. 1B.

FIG. 12 is an exploded view of the gas manifolds being stacked around the fold-over fuel cell assembly.

FIGS. 14A, 14B, and 14C are exterior vertical and horizontal cross sectional views of the D-cell configuration.

DETAILED DESCRIPTION OF THE PREFERRED EMBODIMENTS

Figure 15:
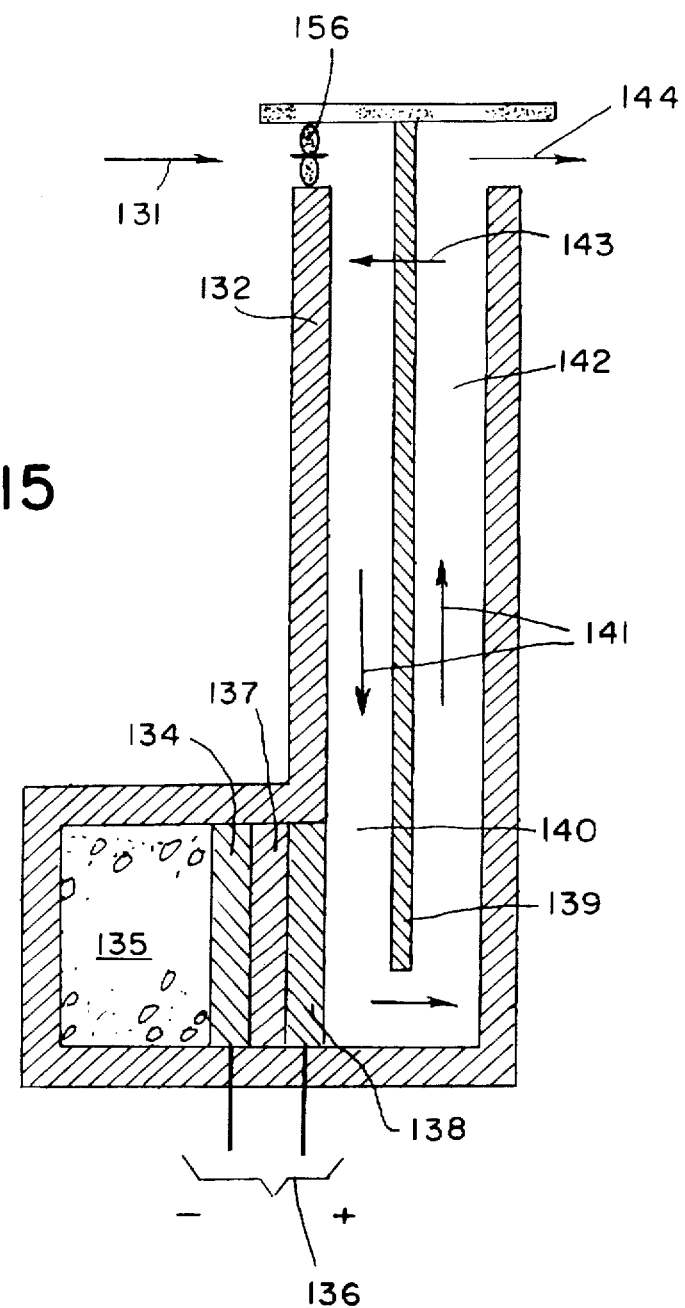
FIG. 15 shows the new fuel cell invention with a water and heat exchange counter flow exchanger.

Two typical embodiments of the invention are illustrated in the drawings. FIGS. 1 through 8 show a configuration to power a cellular phone. FIG. 9 shows the differences of the microstructure of the fuel cell from the Replica Fuel Cell Electrodes. FIGS. 10 through 14 show the fuel cell power package formed by a folding method and configured into the profile of a standard D-Cell. FIG. 15 illustrates how the fuel cells' air input uses a water and heat exchanger to allow the fuel cells to operate at higher humidity and temperature conditions.

FIGS. 1A and 1B show the Surface Replica fuel cell 12 configured into a plastic case 3 with a rechargeable battery 11 to provide power for a cellular phone. The fuel cell is held in place through rivets 1 and a fuel needle 6 with rubber seals 9. Electrical contact is made through electrical contacts 10 on the fuel electrode and contact rivets 1 on the oxygen electrode. In the fuel cell package the fuel cell 12 is wrapped around the rechargeable battery 11. The fuel 5 is contained in a fuel tank bottle 4. The fuel 5 is delivered to the fuel cell 12 through the fuel needle 6. The refueling operation is to open the case 3 and snap in the fuel bottle 4 after puncturing the rubber membrane 8 held by the bottle cap 7. The fuel bottle 4 is held in place by the holding spring 2. The holding spring also has a snap-in bump 159 to latch on the cellular phone. The holding spring 2 and positive electrode 14 in this embodiment are one piece of cut and formed sheet metal. Negative electrode 13 is also of one-piece construction. For this particular embodiment the positive and negative electrodes 14 and 13 are configured to mate with the Motorola MicroTAC® cellular phone and recharging yoke. The power supply may be electrically recharged as well as fueled.

FIG. 2 shows an enlarged cross-sectional view of the fuel needle connections. In this drawing the fuel bottle 4 filled with fuel 5 is shown impaled on the fuel needle 6. In operation, the fuel 5 is drawn into the fuel needle 6 through the capillary tube 15 in the needle. The capillary tube 15 is filled or sized to act as a fuel wick to move fuel to the fuel cell in a controlled manner. Once fuel reaches the base of the fuel needle 6 there are fuel flow ports 27 in the side of the needle to allow the fuel to wick or evaporate out into the fuel manifold 22 and to be delivered to the fuel electrodes 21. The transport through the fuel manifold 22 may be by evaporation and condensation or by liquid wicking through the center of the fuel manifold 22. The two fuel cell 12 electrolytes 20 are shown. It is a system of two fuel cells 12 stacked back to back. To assure sealing of the fuel bottle 4 to the fuel cell 12 there are three gaskets: The first is the rubber membrane 8 that seals the bottle cap 7 to the fuel bottle 4 and to the fuel needle 6. The second is the upper ring gasket 24 which is held down with the rivet fold out 16. The gasket seals to the fuel needle 6 and the fuel cell 12 and also acts as a gentle mechanical clamp of the paper like fuel cell 12. The third gasket is the lower gasket 25 that forms the other side of the gentle mechanical clamp and seal to the fuel cell 12 and the fuel electrode contact 26. The electrical contact is made to the fuel cell by the fuel contact electrode 26 and the contact washer 28. The air manifolds 18 along with the air electrodes 19 are cleared off around the impaling point of electrical contact. The negative sheet metal contact electrode 13 is shown taking the current out of the picture.

Figure 3A:
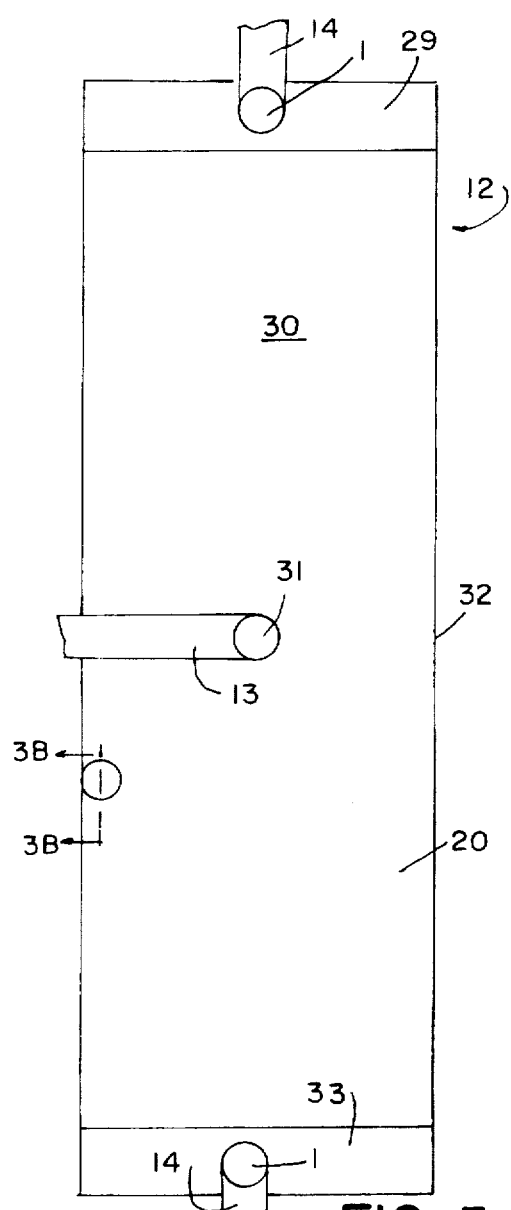
FIG. 3A is an exterior gas manifold view of the fuel cell and electrical connections of the fuel cell shown in FIG. 1A. The outer gas manifold layer is shown in an enlarged cross section in FIG. 3B.
Figure 3B:
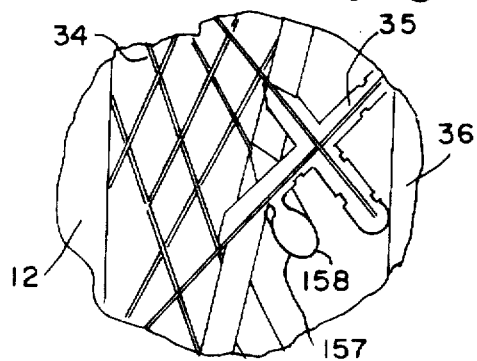

FIGS. 3A and 3B show exterior views of how the fuel cell 12 looks when laid out flat. The positive air electrical rivet connections 14 are shown clamping the ends of the fuel cell 12 outside the fuel cell region 30 and the rim seal 32. The philosophy is to keep the air electrode contact region 29 away from the electrolyte 20. The fuel rivet 31 makes it's fuel and electrical connection in the center of the fuel cell 12. The current from the fuel cell is delivered to the external robust electrical contacts through the sheet metal contacts 13, 14. One of the engineering challenges in these contacts is to make connections from a bulk metal system to the thin mechanical and electrical fuel cell structure without tearing or fatiguing the structure of the fuel cell 12. The rim seal 32 is a heat welded or glued seal. In the FIG. 3A view the air manifold 30 is covering the fuel cell. A microscopic cross-sectional view of the manifold in FIG. 3B schematically shows an expanded Teflon structure 34 with Nafion® 35 wetting the outer surface of the Teflon fibers 34. On the outer surface of the Nafion® 35 coating is a water vapor impermeable but oxygen permeable film 157. The coating 157 has cracks and holes 158 that open up when the Nafion® 35 expands upon high moisture content and close down with low moisture content. That provides a mechanism of regulating the moisture content around the fuel cell. That structure also keeps condensed water from building up on the surface of the electrode while allowing water to condense on the outer surface of the air manifold. The condensed water is wicked across the outer surface of the air manifold or evaporated away to the outside air 36. The outer region 35 provides a moisture regulating source for the fuel cell.

Figure 4A:
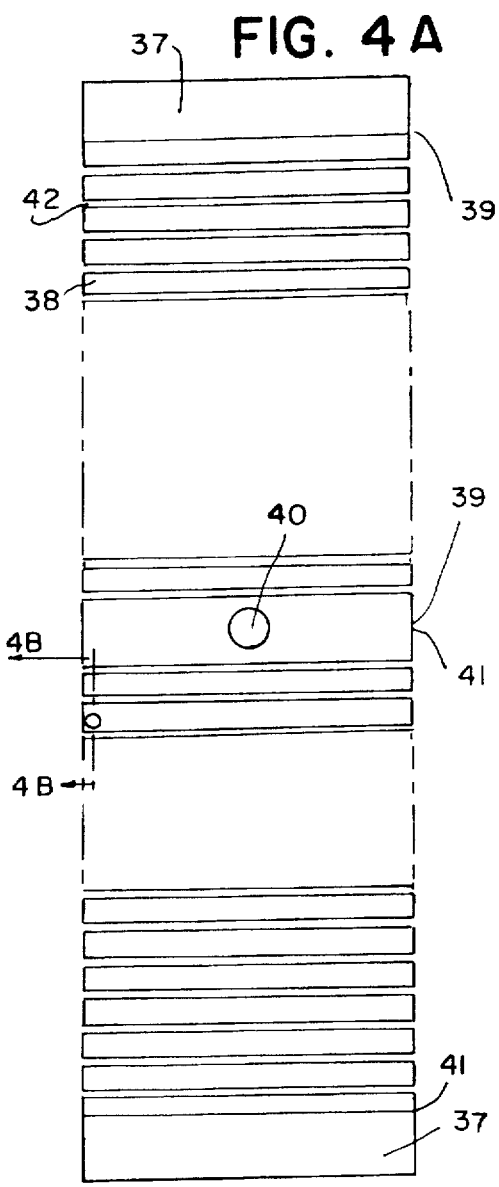
FIG. 4A shows an air electrode layer deposit pattern of the fuel cell of FIGS. 1A and 1B.
Figure 4B:
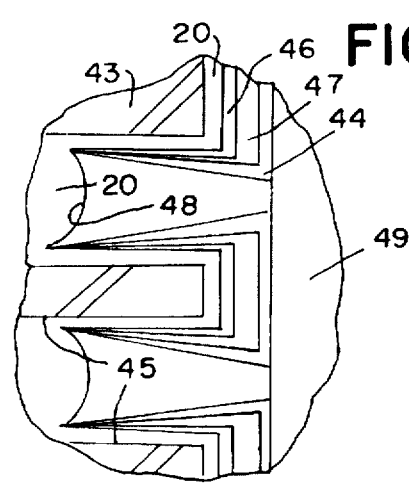
FIG. 4B is an enlarged cross section of the deposited electrode.

In FIG. 4A the contact rivets 14, 31 and air manifold 30 have been removed and only the air electrode pattern is displayed. The air electrode pattern 38 is deposited through masks on top of a porous plastic substrate 43. As shown in FIG. 4B the first layer put down is the electrolyte 20 as a solution deposit of 5% Nafion® in alcohol solvents (Solution Technology Inc., P.O. Box 171, Mendenhall, Pa. 19357). It is then dried, ion milled to roughen the surface, and coated in a vacuum chamber with a sputter deposit of catalyst film 46, such as platinum. A bulk conductor film 47, such as gold, is sputter deposited. A hydrophobic film 44 such as plasma polymerized Teflon is deposited onto the outer surface of the electrode. With the present system the electrolyte 20 is kept free of condensed water by the hydrophobic layer 44, and air 49 electrolyte interfaces 48 are maintained within the fuel cell electrode pores 45. The air 49 diffusion path is kept short by using sub micron pore diameters 45. The fuel electrical connections 10 shown in FIG. 1B are provided for by keeping the oxygen electrodes 47,46,44 masked away from the fuel connection 40. The positive electrical connections 14 are provided for by masking off the electrolyte 20, and the hydrophobic film 44, leaving a gold contact areas 37. The electrolyte 20 may also be removed by ion milling. The separations 42 between the fuel cells may be masked out during the deposition of the catalyst film 46 and bulk conductor film 47. In the separation regions 42 between the fuel cells the electrolyte is ion milled away, and the hydrophobic film 44 deposited. The fuel cell system has two sets of fuel cells 39 and 41 going away from the fuel connection zone 40.

Figure 5B:
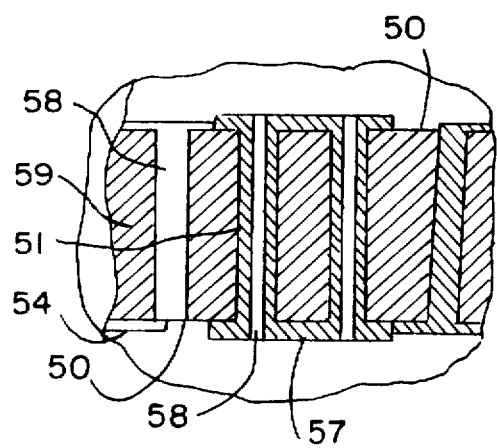
FIG. 5B is an enlarged cross section of the through connections.
Figure 5C:
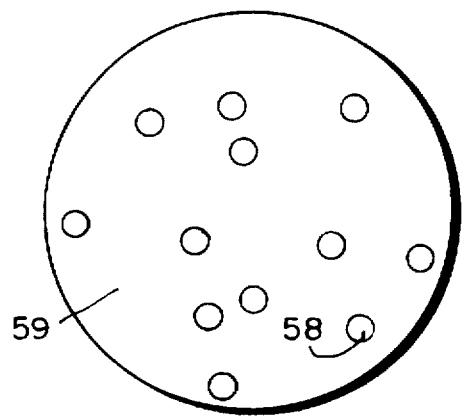
FIG. 5C is an enlarged face-on view of the etched nuclear particle track membrane substrate.
Figure 5A:
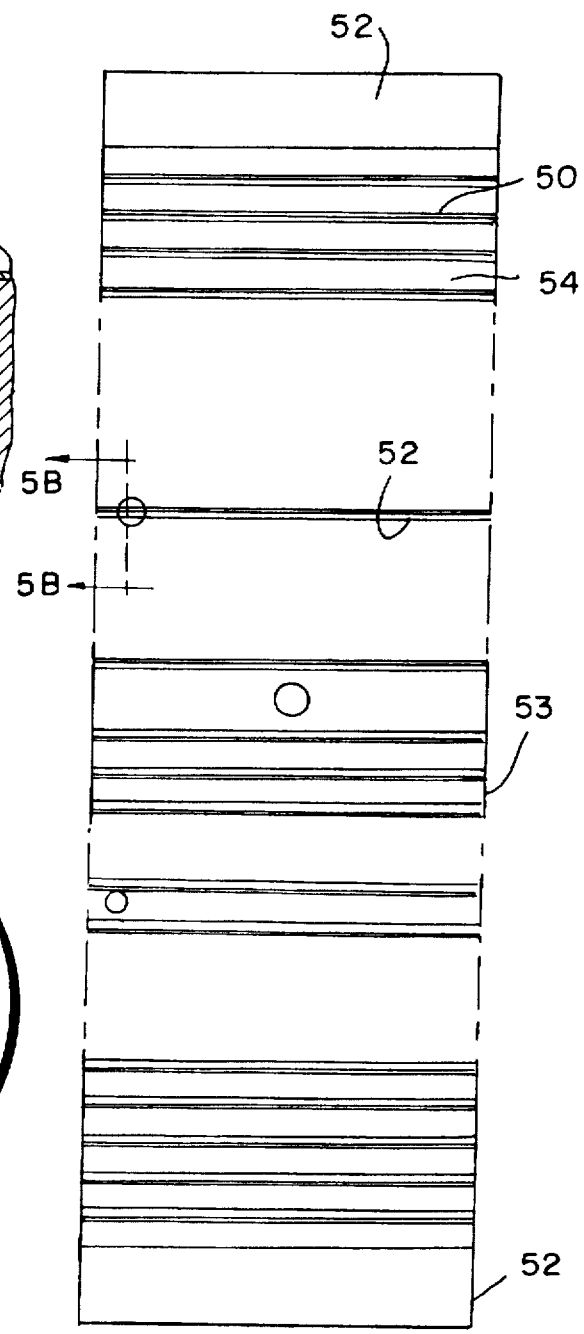
FIG. 5A shows an electrolyte matrix layer under the air electrode of FIG. 4A.

In FIG. 5A the underlying electrolyte matrix layer is shown. The starting material is a porous membrane such as etched nuclear particle track plastic membrane Nuclepore® 59 as shown in FIGS. 5B and 5C. Through contact regions 51, 52, 57 are obtained by sputter depositing the bulk conductor though the porous membrane 59. Before the electrolyte 20 is deposited, the through deposits are created by using a succession of bulk conductor deposits followed by an ion mill to work the deposit through the pores 58 in the membrane. That is done to both sides of the membrane to complete the through contact regions 51, 52, 57. The electrolyte 58 is deposited as a solution of 5% Nafion® in alcohol solvents by dip and dry. The fuel cell gaps 50 are cleared of electrolyte 20, 58 by ion milling. The surface of the through contacts 51, 52 may also be cleared of electrolyte 20, 58 by ion milling. The fuel cell regions 53, 54 are left covered with electrolyte for the fuel cell electrodes 38 shown in FIG. 4A.

Figure 6A:
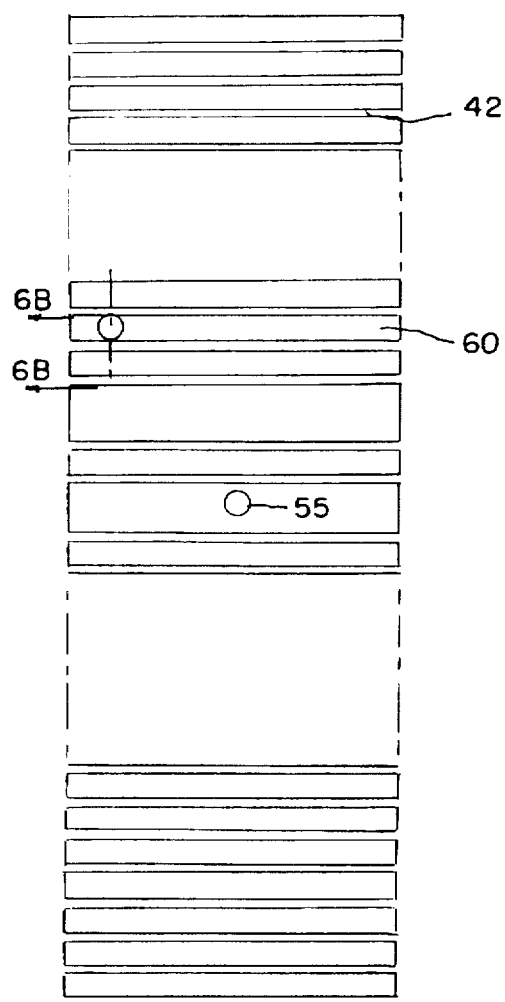
FIG. 6A shows a fuel electrode layer deposit pattern opposite the air electrode of FIG. 4A. An enlarged cross section of the electrode deposits is shown in FIG. 6B.
Figure 6B:
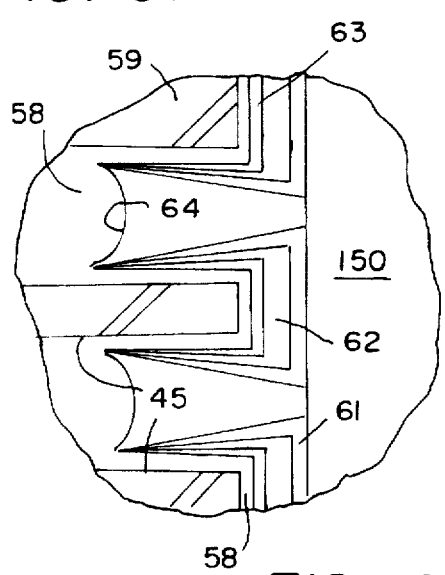

In FIGS. 6A and 6B the fuel electrode deposits are shown. The fuel cell electrode regions 60 are masked off with cell separation gaps 42. The electrical contact 55 is a bulk metal through contact. The microscopic details of the electrodes are shown in cross-section. To form the fuel electrode the same sequence of deposits, that are going on for the opposite side of the porous plastic membrane substrate 59, is used. The Nafion® electrolyte 58 is deposited, onto the porous substrate 59. The fuel electrode pattern 60 is deposited through masks on top of a porous plastic substrate 59. The first layer that is put down is the electrolyte 20, 58 as a solution deposit of 5% Nafion® in alcohol solvents (Solution Technology Inc. PO Box 171, Mendenhall, Pa. 19357). That layer is then dried, ion milled to roughen the surface and coated in a vacuum chamber with a sputter deposit of catalyst film 63 such as platinum. A bulk conductor film 62 such as gold is sputter deposited. A hydrophobic film 61 such as plasma polymerized Teflon is deposited onto the outer surface of the electrode. With the present system the electrolyte 58 is kept free of condensed water by the hydrophobic layer 61, and fuel gas 150 electrolyte interfaces 64 are maintained within the fuel cell electrode pores 45. The fuel electrode deposits are coated over the electrolyte matrix previously shown in FIG. 5 to make the through connections 51.

Figure 7A:
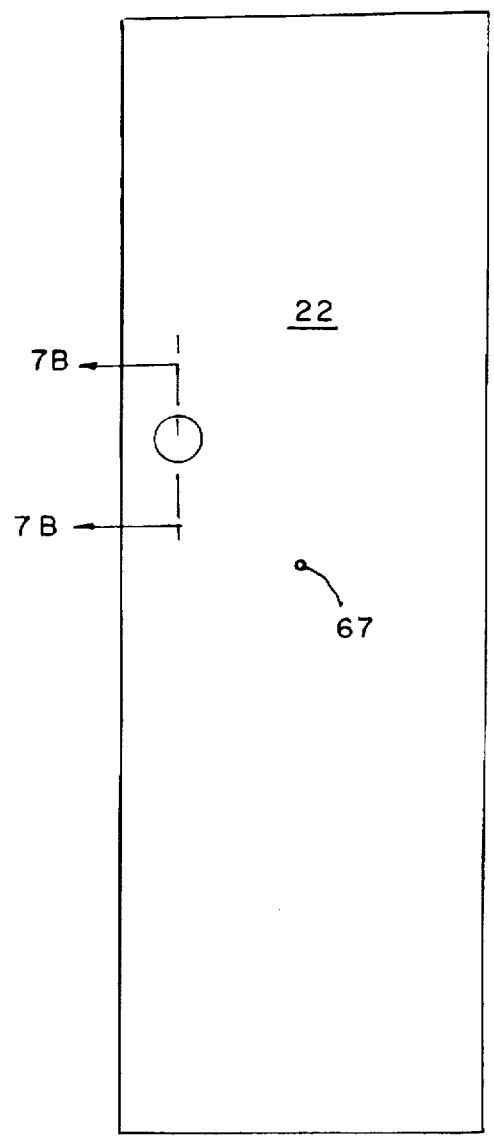
FIG. 7A shows a fuel manifold in the center of the fuel cell stack of FIGS. 1A and 1B.
Figure 7B:
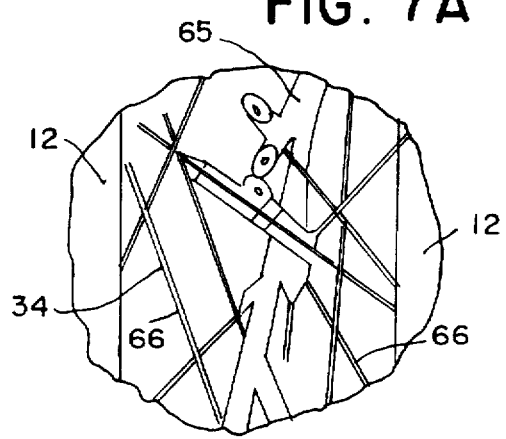
FIG. 7B is an enlarged cross sectional view of FIG. 1A.

In FIGS. 7A and 7B the fuel manifold is shown. That is the central layer of the fuel cell 12 and the manifold 22 presses up against the two sets of fuel cells 12. The second set of fuel cells is a duplicate set. In the microscopic cross-section the manifold material is a hydrophobic material such as expanded Teflon fibers 34. The central region 65 of the manifold is made hydrophilic with a coating such as Nafion®. The outer surfaces 66 of the manifold are hydrophobic. A hole 67 is provided for the fuel inlet.

Figure 8:
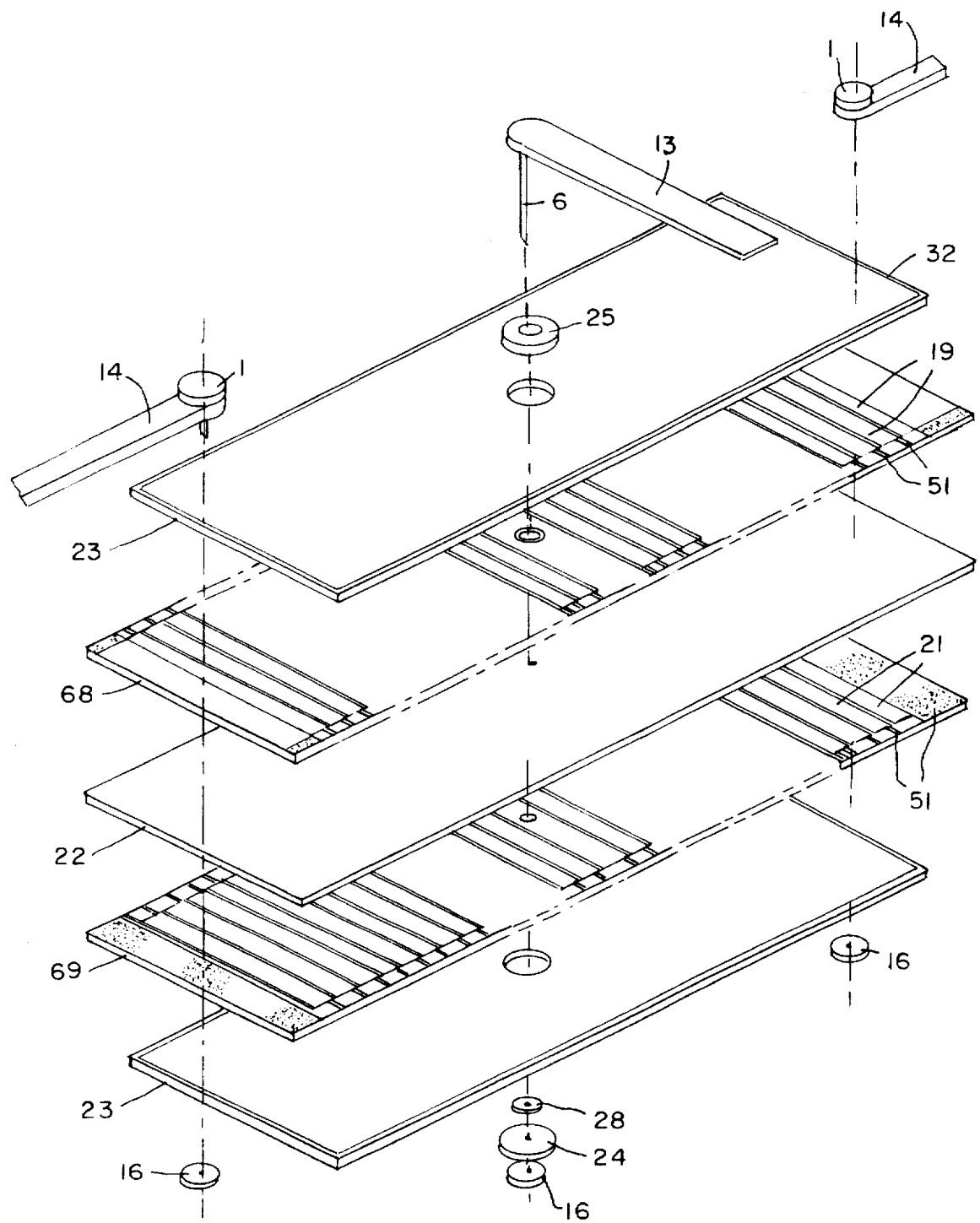
FIG. 8 is an exploded view of the fuel cell assembly used in the cellular phone power supply shown in FIGS. 1A and 1B.
Figure 9:
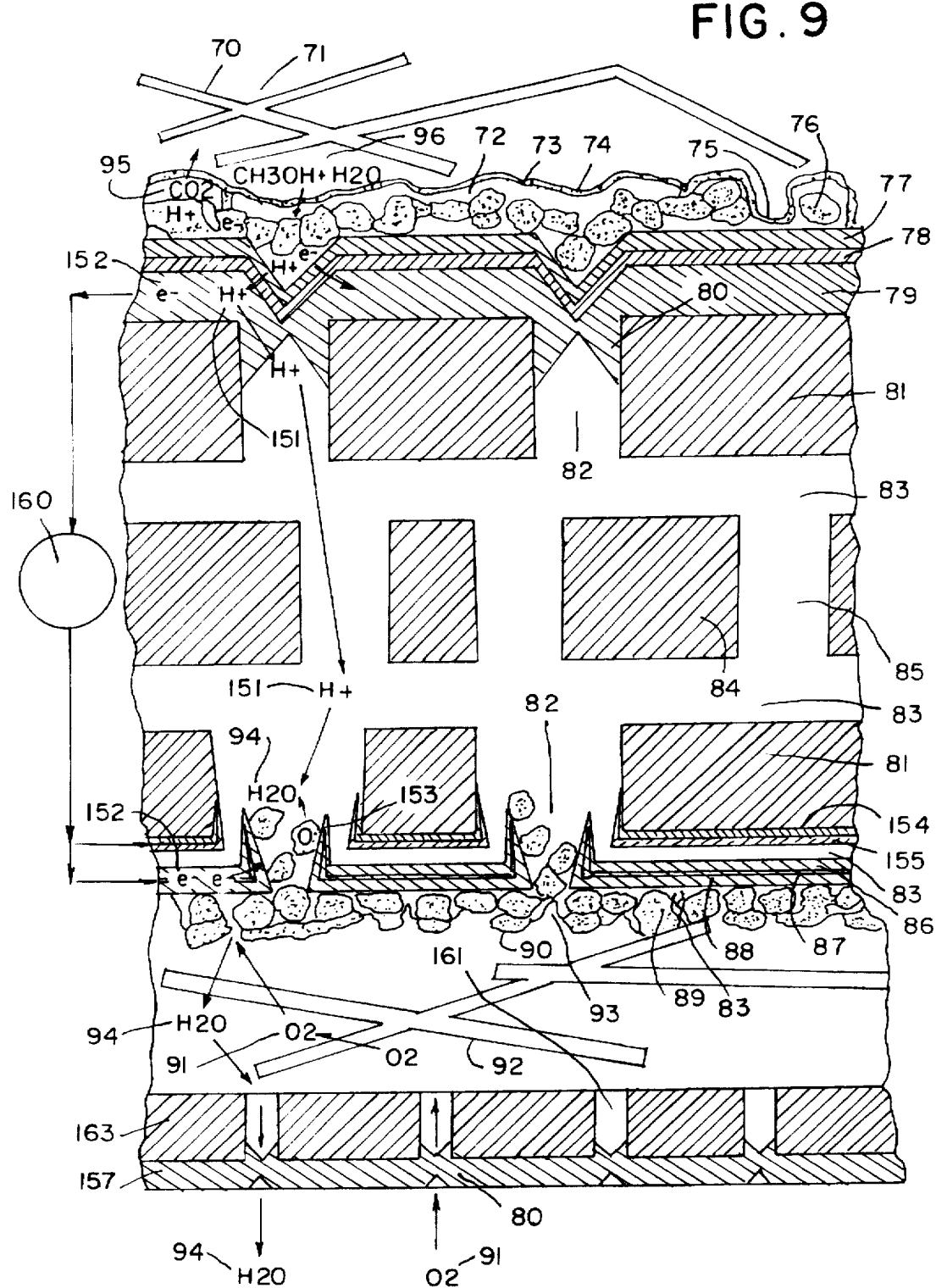
FIG. 9 ia an enlarged cross sectional view of the invention using powder supported catalysts, methanol fuel, pore-free electrodes and surface replica fuel cell electrodes.

FIG. 8 shows an exploded view of the fuel cell assembly. The air electrode contact rivets 1 are shown with the rivet fold outs 16 clamping the air electrodes 19 together and making electrical contact. The fuel needle 6 pierces through the center of the fuel electrodes 21 and the fuel manifold 22 to make electrical contact through the contact washer 28. The clamping pressure and sealing is done through the lower gasket ring 24, and upper gasket ring 25. The through contacts 51 are shown at the trailing edges of the air electrode pattern 19 and then over to the edge of the leading edges of the fuel electrodes 21. That pattern of connections achieves the desired series cell connections current path "sewn" through the single membrane 59. The air manifolds 23 are show sandwiching the first set of fuel cells 68, the fuel manifold 22 and the second set of fuel cells 69. The stack of membranes is heat or glue sealed at the rims 32 sealed on the edges of the air manifolds 23. The fuel cell assembly 12 is placed in the power supply system shown in FIG. 1.

FIG. 9 shows an enlarged view of a hybrid design of the Surface Replica Fuel cell electrodes with powder catalysts and a semi-permeable electrode. The first notable feature of the present design is the semi-permeable electrode that is made of three layers. The first film is a hydrogen permeable metal film 79 that is deposited with a wide angle sputter source to form plugs 80 in the pores 82 of the porous material 81 or directly coating on the solid electrolyte 83. An example is a 20-nanometers thick palladium film on a Nuclepore® filter membrane with 15-nanometer diameter pores. A second structural metal film 78, such as platinum, is deposited onto the hydrogen permeable metal film 79 to mitigate the hydration induced cracks that occur in many of the highly permeable metals such as palladium. A third hydrogen permeable metal film 77, such as palladium, is deposited over the structural metal film 78. The third layer of metal, such as a blend of Pt/Ru/Pd, needs to be capable of accepting hydrogen ions and be catalytically active to the alcohol fuels.

The dynamics of the layered structure is that the two outer metal films 77 and 79 have a high hydrogen permeability, high concentration of hydrogen ions, and have a high rate of surface acceptance of hydrogen ions. They serve as reservoirs of mobile ionized hydrogen on either side of the structural metal film 78. The structural metal film 78 by itself has a low surface rate of acceptance of hydrogen ions, and has a low equilibrium concentration of hydrogen ions, but, with the surface coatings 77 and 79 acts as an efficient conduit of the hydrogen ions and it does not fracture due to hydration. An alternate method of forming the semi-permeable electrode is with the deposition of a metal alloy that exhibits a high permeability to hydrogen ions, low permeability to other ions, does not fracture due to hydrogen hydration, and its surface is catalytically active for hydrogen and alcohol.

On the surface of the hydrogen ion only permeable electrode 77, 78, 79 powder catalyst particles 76, such as Pt/Ru coated activated carbon (Pt 20% wt, Ru, 10% wt. on VULCAN X-72R Carbon, from Electrochem Inc., 400 W. Cummings Park, Woburn, Mass. 01801), are deposited as a slurry ink with a solution of 5% electrolyte Nafion® dissolved in alcohols (Solution Technology Inc. PO Box 171, Mendenhall, Pa. 19357). The deposited slurry 76 is dried, ion milled, and sputter coated with a 30 nm Pt/Ru film 74 to enhance the electrical connections 75 of the catalytic particles 76 to the outer permeable membrane 77. The 30-nm Pt/Ru film 75 has pores 73, for the alcohol fuel 71 permeation, due to shadowing of particles 76 and the expansion of the electrolyte 72 when it is hydrated.

The alcohol fuel 71 shown as a 1:1 mixture of methanol and water 96 diffuses into the fuel electrolyte 72 and then catalytically cracks on the catalyst surfaces 76 and 77, with a net production of hydrogen ions 151. The hydrogen ions 151 move from the catalytic particles 76 into the outer permeable membrane 77 by either diffusing through the particles 76 or going into the fuel electrolyte 72 and into the permeable membrane 77. The hydrogen ions formed on the outer permeable membrane 77 from the cracking of the methanol and water 96 diffuses into the permeable membrane 77. The electrons 152 removed in the process of forming the hydrogen ions from the fuel 96 move through the electrode 76, 77, 78 to the external electrical load and arrive at the oxygen electrode 86,87,88, 89.

To deliver fuel to the fuel electrode 75,76,78, and 79 a porous hydrophobic fuel manifold 70 is used to allow only fuel vapor to reach the electrode surface 74. The fuel manifold 70 is made of such materials as expanded Teflon or Microporous® polypropylene (3M corporation).

The hydrogen ions 151, after they are absorbed into the outer permeable metal 77, diffuse through the structural metal 78 and on to the electrolyte interface of the plugged pore 80 and the electrolyte 83. The electrolyte may be a solution deposited Nafion® and it may be chemically different from the fuel electrolyte 72 because it is separated by the hydrogen ion only permeable electrode 77,78, 79. At the interface of the plugged pore 80 and the electrolyte 83 is where the hydrogen ions enter the electrolyte 83. The hydrogen ions then travel through the electrolyte filled pores 82, 84 of layers of porous substrate plastic, such as Nuclepore® filters. The pores 84 in the inner porous membrane 84 are chosen to optimize the porosity, to optimize the conductivity, diffusion rates, and system costs. When the hydrogen ions 151 reach the oxygen electrode 86, 87, 88, 89, 154, 155 they combine with oxygen ions 153 near the catalytic surfaces of the oxygen electrode 86, 88, 89, 154.

The oxygen ions 153 are created by the catalytic action of the catalysts 86,88, 89, 155 on the dissolved oxygen gas 91 in the electrolyte 83. The end product of the combining of the hydrogen ions 151 and the oxygen ions 153 is water 94. The product water 94 is dissolved in the electrolyte 83 and then diffuses out as product water vapor 94. A porous hydrophobic coating is deposited over the surface of the catalytic particles 89 and electrolyte 83 to prevent liquid water from condensing on the outer surface of the oxygen electrodes 89, 83.

The oxygen electrodes 153, 154 are formed by sputter depositing a film of metallic conductor 154, such as gold, onto the porous substrate 81, and then sputter depositing a catalytic film 155, such as platinum, over the metallic conductor 154. The electrode 154, 155 and porous substrate 81 is solution coated with an electrolyte such as Nafion® 83.

The oxygen electrodes 86, 87,88 are formed by sputter depositing a film of catalyst 86, such as Pt, onto the Nafion® coated porous substrate plastic 81. A second bulk conductor metal film 87, such as gold, is then sputter deposited. An outer catalytic surface film 88 is sputter deposited over the bulk conductor film 87. The sandwich of the fuel electrode membrane 81, 77, 78, 79 with the inner porous film 84, and the oxygen electrode 81, 83, 86,87,88 is assembled with a 5% Nafion® solution and dried. Powder catalyst particles 89 are added as an ink slurry of 5% Nafion® solution. The hydrophobic coating 90 is deposited by vacuum plasma polymerization of PTFE monomer. That film is added to prevent liquid product water from condensing on the surface of air electrodes 89. An ion milling step may be added to increase the electrolyte 83 surface-to-air contact 91.

By surface pit 93 shadowing and grazing angle deposition of PTFE, or by simply depositing a porous film deposition, the outer electrode surface 89, 93 is made permeable to air. Pressed up against the fuel cell electrode 90 is a hydrophobic porous gas manifold membrane 92, such as expanded PTFE. Two films that regulate the water content of the fuel cell are built onto the fuel cell. The first is a film 90 that is preferentially permeable to oxygen and less permeable to water located on the surface of the oxygen electrode 89, 83. The film is formed by plasma polymerization of polychlorofluroethylene film 157 over the surface of a porous substrate 161, such as Nuclepore® filter. The output of the fuel cell is delivered through electrons 152 through the electrical load 160.

Figure 10A:
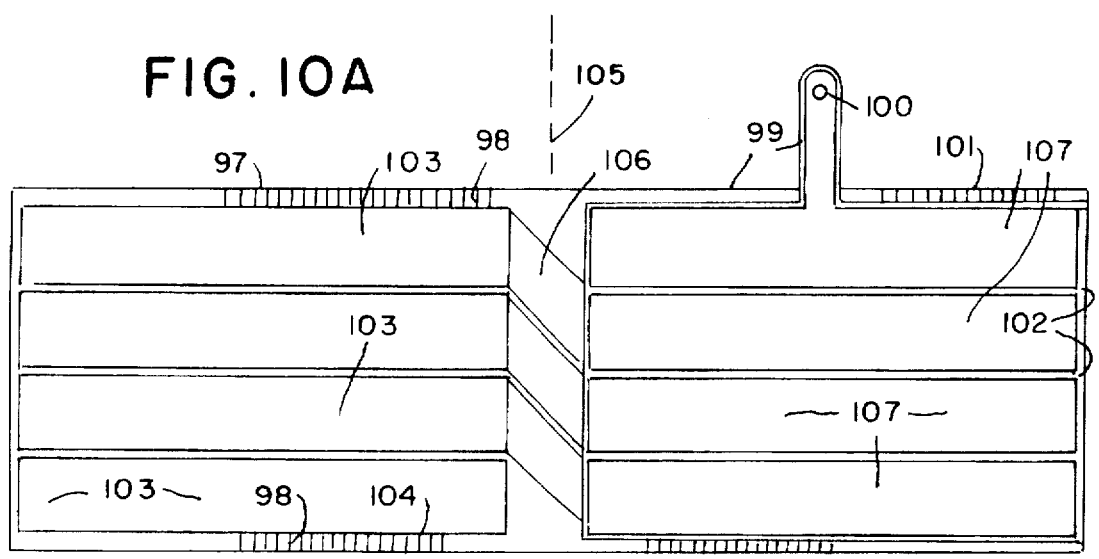
FIG. 10A shows the electrode deposit pattern for the fold-over fuel cell assembly. An exaggerated thickness cross sectional view of the deposits is shown in figure 10B.
Figure 10B:
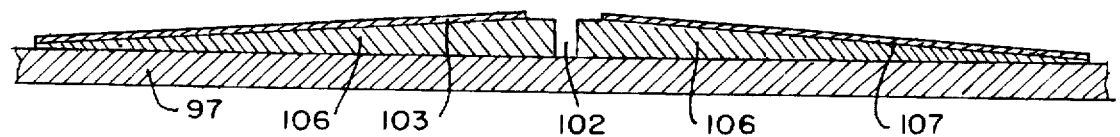

FIG. 10 shows the deposition patterns on the porous plastic substrate to form a folding assembly fuel cell. In this embodiment the fuel electrodes 107 and the air electrodes 103 are formed by coating a single sheet of porous plastic membrane 97 such as Nuclepore® filter membranes with layers of materials as described in FIG. 9.

There are four general deposits to form the fuel cell. The first is a bulk electrode metal deposit, such as gold, deposited in all the fuel electrode areas 107, the wrap around electrodes 106, the air electrode areas 103, the positive frill contacts 104 and the negative frill contacts 101 through masks. The frill contact areas 104, 101 are slitted 98 to form finger-like contacts with bulk metal end caps. These bulk electrical conduction electrodes may be tapered in thickness to optimize the conductivity and cost; thinnest at the edges of the fuel cell membrane 97 parallel to the electrode fold 105, and thickest in the wrap around electrodes 106. The fuel tab 100 may also be coated with the bulk metal conductor to improve the impermeability to fuel. The fuel tab 100, cell breaks 102, and frill contacts may be impermeable areas of the membrane created by heat annealing after irradiation and before etching the Nuclepore material substrate 97.

The second coatings of the fuel cell electrodes 107 are sputtered, evaporated or sprayed onto the electrode regions through masks, as described earlier.

The third set of electrodes, the air electrodes 103, are sputtered, evaporated or sprayed onto the electrode regions through masks. The fourth layer is the electrolytes such as solution deposited Nafion® and in general is impregnated throughout the internal porous areas of the etched nuclear particle tracked membrane 97. The electrolyte is deposited over the fuel cell electrodes 107, and 103. FIG. 9 shows the details of the electrolyte deposits. The electrolyte is either not deposited or removed as by ion milling from the frill contacts 103, 101, fuel tab 100 and the cell electrical separations 102. When the cell is folded on the center line 105 the rim seal area of the fuel cell 99 is shown going around the rim of the fuel tab 100 and the fuel electrodes 107.

Figure 11:
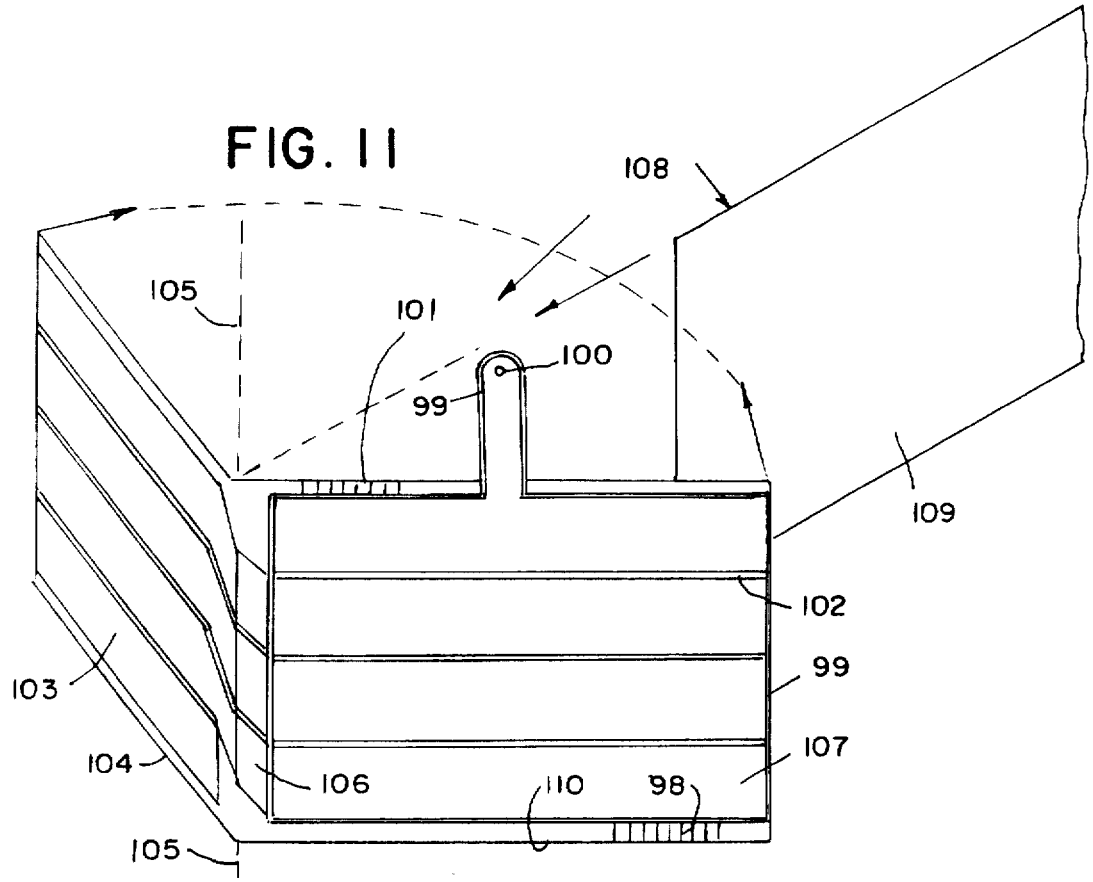
FIG. 11 is an exploded view of the fold-over fuel cell assembly with an inner electrolyte membrane.

FIG. 11 shows the insertion of the inner membrane and folding assembly. The inner porous membrane 109, such as a Nafion® impregnated Nuclepore® filter, is inserted between the folded 105 fuel electrodes 107 and the air electrodes 103.

Electrolyte solution 108, such as 5% Nafion® solution, is added between the fuel electrodes 107 and the air electrodes 103. The assembly with the Nafion® is dried and cured between 80 and 110 degrees centigrade. The wrap around electrodes 106 are shown going around the electrode fold 105. The frill contacts 110, 104, 101 are shown as slits 98 in the membrane. The rim seal is shown going around the fuel electrodes 107 and the cell breaks 102. The fuel inlet tab 100 is shown.

FIG. 12 shows an exploded view of the fold-over fuel cell 112 assembled with the air manifold 113 and the fuel manifold 111. The air manifold 113 is a hydrophobic air permeable sheet material such as expanded PTFE, that is pressed up to the fuel membrane 112. The fuel manifold has an inner porous hydrophobic surface, such as expanded PTFE, and an inner zone 65 that wicks fuel, as shown in FIG. 7. The outer surface of the fuel manifold is a membrane that is impermeable to fuel and water but permeable to carbon dioxide such as polychlorofluoroethylene (Kel-F® 3M corporation). The fuel manifold outer surface carbon dioxide permeability provides an exit for the product carbon dioxide produced by the cracking of methanol and other hydrocarbons. To provide a high enough carbon dioxide permeability and cost effectiveness the outer surface of the fuel manifold may be a lamination of a Nuclepore® membrane vacuum deposited polychlorofluoroethylene and a protective gas permeable lacquer coating such as cellulose nitrate. The fuel manifold 111 is pressed against the fuel cell membrane 112 and the system is heat sealed or glued with a polyester epoxy along the rim seal surfaces 114.

Figure 13:
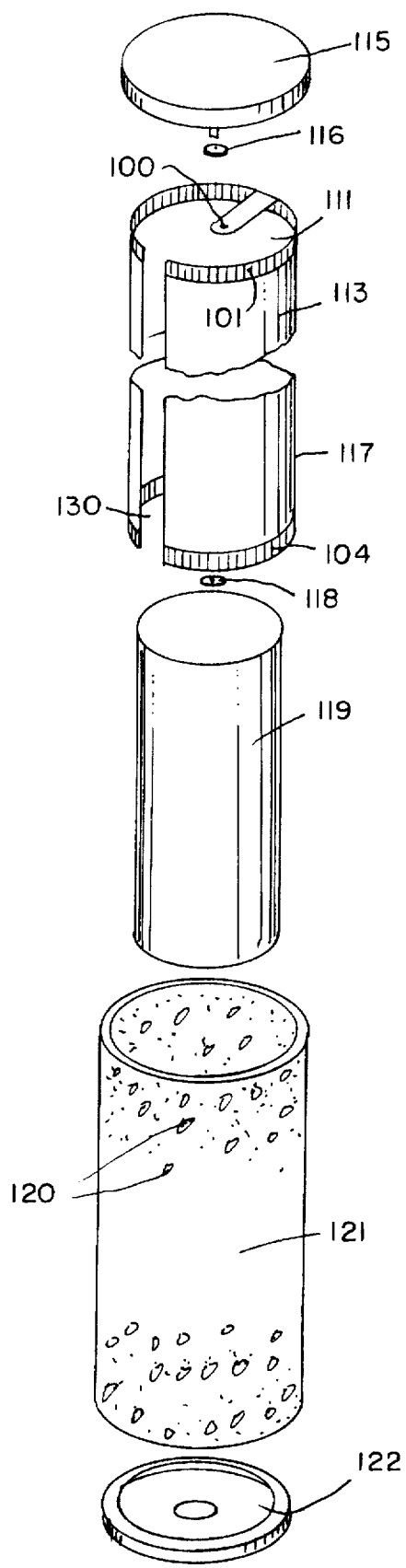
FIG. 13 is an exploded view of the fold-over fuel cell assembled with a liquid fuel ampoule into the physical profile of a D-cell battery.

FIG. 13 shows the assembly of the folded fuel cell into a cylindrical geometry to match the physical profile of a standard D-cell battery. The fuel cell assembly 117 is wrapped around with the air manifold surface 113 facing out. The fuel tab 100 is bent over to be punctured by the fuel needle and terminal cap 115. A fuel gasket 116 is placed above the fuel tab 100 and a fuel gasket 118 is placed below the fuel tab 100. The negative frill tabs 101 bends and makes a cantilever beam spring contact against the inner surface of the negative terminal cap 115. The positive frill tabs 104 bends and makes a cantilever beam spring contact against the inner surface of the negative terminal cap 122. The fuel filled fuel tank 119, such as a methanol and water filled and sealed polyethylene cylinder, slides up inside the fuel cell assembly 117. The fuel connection to the fuel cell is made when the fuel tank 119 wall is punctured by the fuel needle terminal cap 115. The terminal caps 115, 122 are held together by attaching to the dielectric tube 121, such as by threading and screwing the caps and tube, gluing or heat fusing the dielectric tube to the end cap. A gap 130 in the fuel cell assembly 117 is left, and the dielectric tube 121 is made transparent to allow the fuel level to be visually checked. The dielectric tube 121 has vent holes 120 formed in it to allow air in and product gases and vapors out. The number of vent holes and sizes are strategically used to throttle the oxygen diffusion intake and water diffusion removal rate.

FIGS. 14A, 14B and 14C show the assembled fuel cell in a standard D-cell physical profile. Three views are shown: the exterior side view in FIG. 14A, a side cross section through the centerline in FIG. 14B, and the vertical view horizontal cross-section in FIG. 14C. The exterior view drawing shows the major dimensions of the standard D-cell battery 162 which is 5.8 cm long and 3.3 cm in diameter. In the vertical cross section, the positive terminal cap 122 is electrically contacted to the fuel cell 126 through the frill contacts 104. The fuel tank wall 124 is designed to have an end alignment bump 123 to provide a centering and positive pressure point on the fuel tank 124. The alignment bump 123 may also be the heat seal-off point after filling the fuel tank. At the other end of the fuel tank 124 skewering on the fuel needle 127 provides the centering alignment. The negative terminal cap 115 is electrically connected to the fuel cell 126 through the negative frill contacts 101. The fuel needle 127 is shown penetrating the fuel tank wall 124, immersed in fuel 125, and sealed by the fuel gaskets 118 and 116. The fuel path mechanism through the needle and to the fuel cell tab 100 is the same as in FIG. 2 except that the contact washer 28 and rivet fold-out 16 are not used, since the negative electrical connection in that case is made through the frill contacts 104 instead of the fuel connection.

In the horizontal cross sectional view the fuel window gap 130 is shown to allow the fuel level to be conveniently visually checked. The fuel tank wall 124 and the dielectric tube 121 need to be transparent in the window gap 130 area for the fuel checking scheme to work. An air flow gap 128 is left between the fuel tank and the inner surface of the fuel cell 126 to allow carbon dioxide to be removed by diffusion. An air flow gap 129 is left between the dielectric tube 121 and the fuel cell outer surface 126 to allow oxygen in diffusion and water removal from the fuel cell 126 out through the vent holes 120.

FIG. 15 shows a schematic view of how the fuel cells are coupled to a water and heat counter flow heat exchanger. In the event that the fuel cells' power levels are high enough to merit active air flow or need the advantage of operating the fuel cells above ambient conditions, such as 80 degrees centigrade. A scheme of using a counter flowing heat exchanger with a heat transfer membrane 139 is shown. The heat transfer membrane 139 conducts heat and moisture between the in flow 131 and out flowing air 144. The water permeable membrane 139 may be a composite structure such as Nafion® impregnated Nuclepore® filter that is moisture permeable due to the Nafion® and obtains it's structural strength from the porous Nuclepore® substrate. In operation the inlet air 131 is fanned 156 into the entrance line 140. As the air is heated by the outgoing air 144 it absorbs moisture diffusing through 143 the heat exchange membrane 139. Heat and moisture are exchanged between the in flowing air 140 and the out-flowing air 142 with the counter parallel gas flow 141. The inlet air 131 arrives at the air electrode 138 heated and humidified. The fuel cell 136, air electrode 138, electrolyte 137, fuel electrode 134, fuel 135, and the heat exchange system are thermally insulated 132.

The above descriptions contain specific examples that should not be construed as limitations on the scope of the invention, but rather as exemplifications of preferred embodiments. Nafion® electrolytes and Nuclepore® filter materials were chosen because they have well-known properties. Many other variations are possible.

MICROSTRUCTURE

Many of the new concepts that are to be added to the previous patent application are to solve the problems of using hydrocarbon fuels, or simply using dirty fuels with impurities that may diffuse through the fuel cell. If these hydrocarbons such as methanol or ethanol diffuse to the oxygen electrode it reduces the performance of the oxygen electrode as well as being simply a leak of fuel un-used by the fuel cell. Conventional fuel cell techniques to prevent these losses are to use thicker electrolytes, run the fuel cells at sufficiently high power densities to attempt to use all the fuel before it reaches the oxygen electrode, and lower the concentrations of the fuel. All three of these techniques have the problem that they simply increase the resistance to alcohol or impurity diffusion rate at the expense of some other performance parameter. The unique solution is to electrochemically catalyze the hydrocarbons on an electrode and then have the hydrogen ions move through an electrode which is permeable to hydrogen but not to the hydrocarbons. The hydrogen ions then re-emerge out of the electrode into the second electrolyte and travel to the oxygen electrode. That scheme is formed with two outer electrodes and a third inner separate diffusion electrode or the diffusion electrode may be the under-layer of either the fuel or oxidizer electrodes. The particular case of interest for the hydrocarbon electrode is a Pt/Ru alloy dispersed over a Pd/Ta/Pd or Pd/Pt/Pd hydrogen permeable electrode. The inner support metal identified as Ta or Pt may be a variety of hydrogen permeable materials such as the transition metals which are permeable to disassociated hydrogen. Such as Pd/Ag 77%:23% atomic percent alloy (suitable for hydroxide electrolytes). The selection of the material also depends on the compatibility with the electrolyte. The Pt/Ru side of the electrode is immersed in an alcohol and sulfuric acid electrolyte. The oxygen electrode is a Pt/Ru electrode or other suitable oxygen electrocatalytic metal. The oxygen electrode uses a solid polymer electrolyte.

ELECTROLYTE OPTIMIZATION

Three features come out of the small pore geometry of the porous substrate and the electrolyte. The first is the simple optimization of the electrolytes' conduction to diffusion rates for the performance range expected by the fuel cell. To optimize the fuel cell the desired current density is estimated and then the ohmic loss versus reactant diffusion rates is optimized. An example of optimization is a fuel cell in which the reactants are delivered to the electrodes by diffusion. The heat removed by ambient air cooling with an internal air gap of 2.9 mm, and a target of keeping the fuel cell temperatures from rising above 80 degrees centigrade, sets the current density limit bellow approximately 50 milliamperes per square centimeter. The current density is approximately 1/50th of state-of-the-art solid polymer fuel cells (U.S. Pat. No. 5,234,777). Thus, the electrolyte filled pores of the support membranes are used to choke off the diffusion and ionic conduction flow to keep the fuel cell at the optimum ionic conductivity and reactant diffusion resistance values. With that mechanism of containing the electrolyte and reducing the porosity, as the structure is thinned to maintain optimum performance, it leads to the total utilization of the electrolyte scaling inversely proportional to the square of the thickness of the porous substrate. That reduces the use of expensive electrolytes, such as Nafion®, and subsequently the cost of the fuel cells.

The second feature comes from the suspected molecular alignment of the solid polymer electrolyte, such as Nafion® by being organized by the collimated high surface area of the etched nuclear particle track membranes or dielectric with similar structures. Enhancements of the conductivity of up to 20 times the homogenous electrolyte is expected. If the diffusion permeability for the molecular species is constant then that also results in a net 20 times ion over diffusion rate enhancement.

A third effect is if the mean free path between molecular diffusion species (such as hydrogen gas) is similar to or larger than the dimensions of side channels in a porous structure there is a decrease in the diffusion rate over the simple-gradient cross-sectional-area model. The diffusion characteristics fall into the regime of molecular flow diffusion in vacuum systems where wall convolutions, such as in bellows pipes, may effect the conductance of the pipe. The effect is also embodied as providing collimated conduction paths for the ions and lateral dead end pockets for molecular species. The specific embodiment is the stacking of two or more membranes with pores smaller than the molecular species mean free path, wherein the inter-membrane gaps act as the side channels. Or simply having side channels to the main ion paths in the system on the scale of the molecular specie's mean free path between their molecules. The present diffusion resistance mechanism may also be used in other mixed ion and non-ion diffusion systems such as photovoltaic, thermoelectric and thermionic systems as well.

FOLD-OVER DESIGN

A very simple scheme of forming all the electrodes of the fuel cell on a flexible single substrate sheet is a fold-over design. In that design the cell interconnection routes, cell electrical separations, and fuel and oxidizer electrodes are made on one side of a membrane. The fuel cell is then assembled by folding the membrane. That design also permits the fuel cells to be formed from commercially available uniformly porous substrates such as Nuclepore® filters, where any number of inner electrolyte layers may be inserted. The extra degree of freedom in the fuel cell construction helps optimize the fuel cell by constricting the porosity. Controlling the micro geometry of the electrolyte is beneficial to the performance of the fuel cell. The inner membrane is used to preferentially block different molecular species over the ion transport by geometrical design or chemical properties.

LAYERS OF ELECTRODES

There are two principal functions of the fuel cell electrodes; the first is to electrocatalyze the fuel or oxidizer, and the second is to electrically conduct the electrons out of the fuel cell to the electrical load. These two functions and properties are not often embodied in a single complementary material: A high surface area catalyst structure that has a low electrical conductivity because of the tortuous electrical path through the structure, and a high electrical conductivity structure that has a smooth surface with minimal surface area. A way to have the best of both materials is to have a smooth electrode layer coupled with a high surface area catalyst, such as sputter deposited gold film electrodes covered with catalysts supported by activated charcoal powder.

SIMPLE MASKING

A simple method of forming an array of fuel cell electrodes on porous dielectric substrates is to sputter, vacuum evaporate or spray metals and electrolyte solutions through mask patterns. Directed deposits like ink jet printing or molecular beam deposit may be used. Directed removal methods such as ion milling and laser ablation are used to define the electrodes. The previous patent application U.S. Ser. No. 08/531,378 described more sophisticated methods of creating self masking substrates. For the uniformly porous plastic substrates that are commercially available, such as Nuclepore® filters, forming the electrode patterns through masks is simple and practical. Many other printing and lithographic techniques may also be used to place the fuel cells and circuits onto the porous plastic substrate. Ink jet printing may be used to spray on the electrode patterns and fuel cell electrodes that are formulated as slurries of catalytic, and conductive particles and or electrolytes. The use of xerography is also possible where the patterned materials; catalytic, conductive, electrolyte, or insulator particles are electrostatically attracted to the surface of the fuel cell substrate. Combinations of using the vacuum vapor deposited electrode patterns to then be thickened by electroplating or attracting charged particles are used to build on the patterns from a previous deposition. Photolithography and/or electrochemical processes are also used to define or form electrode patterns.

COLLIMATED ELECTROLYTES

A unique feature of using an electrolyte that is locked into a collimated dielectric material is that it has no lateral conductivity. Diffusion of reactants are limited primarily to the direction of the collimated pores. These two properties pose an advantage to a fuel cell system of adjacent fuel cell stacks on a single membrane. If the electrolyte is eliminated from the surface substrate in the electrical separation areas, between adjacent fuel cells, the shunting route is cutoff. Another variation is that the cell separation areas may simply be non-porous areas of the substrate plastic before the electrodes and electrolytes are added. A simple method of doing that with the etched nuclear particle tracked membranes is to either not irradiate those regions or thermally anneal them after irradiation and before etching. Another feature of the collimation is that when there are pinhole defect leaks in the pore-free electrode the lateral spreading of the fuel leak is confined to the fuel cell electrode directly through the electrolyte due to the collimation. That limits the degree of oxidizer electrode poisoning.

HEAT AND WATER EXCHANGE

A particular problem of water bearing electrolyte fuel cells is that if they are operated at a range of temperatures or reactant humidities the electrolyte's water content varies. That may lead to sub-optimum performance of the electrolyte with the electrolyte either drying out or flooding the electrodes. To solve that problem a heat and water counter flow exchanger is used. The design of the heat and water counter flow exchangers is to use thin water permeable membranes as the heat exchange elements. For high rates of heat and water transfer these membranes need to be thin. The membranes are made of a composite material that uses a high strength matrix for structural integrity. The matrix is impregnated with a moisture exchange material such as Nafion® or cellulose nitrate.

For a non-actively flowed fuel cell system a moisture retaining film is used to operate at temperatures above the point or where the electrolyte dehydrates if directly exposed to the air. The membrane is formed by coating the oxygen electrode with a film or the air manifold such that is permeable to oxygen and less permeable to water. The membrane is pore-free or has periodic pores. Periodic pores provide a mechanism of loosing excess liquid water.

TAPERED ELECTRODES

The amount of metal in the electrical conduction electrodes are optimized in these thin film fuel cell inventions if the electrode thickness were tapered from the minimum thickness, for conduction, up to the point where the electrode leaves the fuel cell and is making the connection to the next adjacent cell.

VAPOR FUEL DELIVERY

There are two principal means of delivering methanol fuel in a small fuel cell that has no moving parts. The first is to use wicking of the fuel to the fuel cell electrode. But liquid wicking requires there be liquid contact with the fuel and the fuel cell electrode. That leads to problems that were mentioned earlier. If the fuel is vaporized before it reaches the fuel cell electrodes the problems of physical contact are eliminated. What is used is a combination of liquid fuel being wicked out of the fuel bottle, wicking the fuel into a layer near the fuel cells and then using vapor transport through a hydrophobic matrix to reach the surface of the fuel electrodes. For these low power density fuel cells where the air electrodes are ambiently cooled and supplied with oxygen only through diffusion the fuel vapor diffusion rates are sufficiently fast enough over 0.1 mm to 20 mm distances.

PORE-FREE ELECTRODES

Very thin flexible metal foils are supported by a plastic substrate in the present invention. The practical use of these foil membranes is to fill the need in the directly fueled alcohol fuel cells to block methanol diffusion through the electrolyte while efficiently conducting the ionic current. A metallic foil solves that problem if the foil is made thin enough to satisfy the necessary throughput rate and economics. To form the thin foil electrode a large range of metallic elements, that exhibit hydrogen chemisorption, are deposited onto the porous substrates or directly on a solid electrolyte. The plugging of the pores is done with a wide angle hydrogen permeable metal sputter deposit that is thicker than the substrate's pore diameters. In addition the metal foil may be built up in layers to provide various properties. It is noted in the literature that below 200 degrees centigrade much of the diffusion rate of gases through metal foils is dominated by the chemisorption rate on the surface of the foil (Vielstich, 1965). For pure hydrogen fuel cells, a catalyst surface layer such as platinum on both sides of the foil increases the throughput rate of hydrogen through the electrode. With direct methanol and hydrocarbon fuel cells the hydrocarbon fuel side of the membrane has to incorporate catalysts that may catalyze or be immune to hydrocarbon molecules and their products to avoid poisoning. While on the side of the foil membrane opposite the hydrocarbon fuel the surface catalysts may be optimized for hydrogen. Other considerations in the design of the foil are that many of the transition elements with suitable permeabilities, such as Pd that have very high hydrogen permeability, have the disadvantage that they expand as they hydrate and subsequently crack. That property is fairly common among the metal hydrogen hydrates. Thus, to prevent the problem of stressing and cracking, the thin foils are alloyed, such as, by (77:23) palladium alloy that is currently used in hydrogen purifiers. Another option is to form the foil membrane in layers. In a layer design the inner layer has a low equilibrium concentration of hydrogen, does not crack, and is the structural barrier. While the outer layers provide the fast surface exchange reaction rates and surface area. Another feature of layering is that the first layer deposited has a high permeability rate for hydrogen ions, while if the second structural layer has low permeability, the first layer provides a lateral diffusion route to the substrate pores that effectively lets the whole structural membrane be used as a diffusion membrane.

As an example, current tests are on Nuclepore® filters with 15 nm diameter pores. These membranes have been sputter coated with first a 3.7 nm Pd film, second a 15 nm Pt film and third with a 7.5 nm Pd film. At these thicknesses and geometries the membranes have hydrogen diffusion rates at room temperatures that are equivalent to 10–20 ma per square centimeter at 23 degrees centigrade. That is in the desirable current density range for small ambiently cooled and diffusion reactant supplied fuel cells. These membranes are also inexpensive compared to the earlier 12 micron thick membranes because they use so much less material, at 1/800th the thickness. The assembly constitutes a methanol fuel cell that electrocatalytically cracks the methanol with an electrolyte on the fuel side of the membrane and then filters the hydrogen ions, or hydrogen gas and forms a fuel cell on the other side of the filter membrane in the other electrolyte. The methanol cracking electrocatalytic process requires the addition of water. Thus, it is necessary to have two electrolytes, one on the fuel side of the pore-free metal foil and other on the oxygen side. That prevents the methanol and water cross-over to the oxygen fuel cell electrode.

DIFFERENT ELECTROLYTES

A pore-free metal foil barrier in the fuel cell separating the electrolytes permits the possibility that two different electrolytes may be placed on either side of the pore-free metal foil barrier. One arrangement is to make the methanol fuel electrode the hydrogen only pore-free electrode using Nafion® and sulfuric acid on the fuel side and a KOH electrolyte on the oxygen side of the pore free electrode. The oxygen kinetics are more favorable in the KOH electrolyte while acidic electrolytes are used with the fuel side because the KOH electrolyte forms carbonates if it were used on the fuel side.

STOICHIOMETRIC FUEL DELIVERY

The pore-free electrode or barrier in the cell also blocks the ionic drag of water as well as the methanol fuel. For hydrocarbon fuels where the hydrocarbons are being reformed to hydrogen and carbon dioxide the source of oxygen for that process is typically water. In conventional fuel cells the water either has to be recirculated in the electrolyte or recaptured from the exhaust products. If the ionic drag of water through the fuel cell is blocked then simply adding a stoichiometric mixture of fuel and water is sufficient to keep the fuel reforming reactions balanced. For example, with the fuel cell that is electrocatalytically using methanol fuel it needs to have a stoichiometric fuel mixture one molecule of water for every molecule of methanol to allow the methanol to catalytically oxidize and form carbon dioxide and hydrogen. Thus a 1:1 molar mixture of methanol and water fuel mixture is adequate to eliminate the need to recapture water from the fuel cell exhaust.

Without water recapture and circulation the direct methanol fuel cell becomes significantly simpler. The oxygen electrode only needs to retain sufficient product water to avoid being dehydrated and diminishing it's performance. The fuel electrode uses water and fuel at equal rates. Thus, when the fuel cell runs out of water, it also runs out of fuel.

BULK ELECTRICAL CONNECTIONS

One of the features of these fuel cells is that the apparent optimum bulk electrical current carrier is gold. A good figure of merit for a bulk metallic conductor is one that has a high quotient of conductivity divided by density and cost per unit mass ($cm^2/Ohm*\$$). In searching for the most cost effective bulk electrical conductor that may stand up to the typical corrosive environment of the fuel cells, gold's cost, high conductivity and inertness gave it a figure of merit of roughly four times that of platinum. Various other conductors in the Pt metal group were ranked: Ru 2600, Pd 1900, Au 1500, Ir 900, and then Pt 390 ($cm^2/Ohm$). Ruthenium has the highest figure of merit of the platinum group of elements but it's low ductility and possible surface oxidation makes it less versatile than gold. Palladium in combination with other materials to avoid cracking due to hydration is also being studied as an effective bulk metallic conductor. Palladium is also advantageously used as a hydrogen permeable electrode and the bulk conductor. Gold's high conductivity allows the fuel cell coating to be extremely thin permitting very little loss of active surface area of the electrodes. Gold films are used as hydrogen diffusion barriers due to their low permeability to hydrogen. That property is used to improve the low discharge rate cell efficiency where fuel diffusion leakage is the major energy loss mechanism. If the fuel cell electrodes are kept small in dimension, to keep the mean electrical path from cell to cell short, the quantity of gold necessary to form the cells is near the transition point where gold films become good conductors on surfaces. Transition occurs around a gold thickness of 5 nm. Other refractory metals in order of figure of merit are Mo 654,000, V 463,000, W 328,000, Ti 100,000, Ta 65,000 and C 16,000 ($cm^2/Ohm*\$$). The list continues through the pure elements. Alloys such as $Mo_2Si_3$, and WC have been considered. Many of these refractory materials have high figures of merit but are difficult to deposit, may be corrupted in the fuel cell environment, require much thicker films, or make poor contacts due to surface oxides.

FUEL CELL/BATTERY AND OR ELECTRONICS

The electrical system of the power pack is arranged to have the battery connected electrically parallel to the fuel cell or through an electrical current and voltage controlling device. The battery and fuel cell is connected to an electrical voltage and current source to charge the battery and reduce the fuel consumption of the fuel cell or to simply have flexible energy sourcing. A version of the fuel cell with storage capability for the products uses electrolysis in the fuel cell to store energy. The external application of charging voltages also helps clean the fuel cell catalytic surfaces. The end product is a power device that derives it's energy from a fuel or electrical charging or both simultaneously. The charging source may be from a DC electrical source or pulsed source. Photovoltaic cells are also used as the electrical source of energy. Another concept is to mate the fuel cell with a arbitrary wave form generator and produce any alternating current output desired by the user. Another hybrid power scheme is to energize a flywheel with the fuel cell's low continuous output and then draw off power to match the demand. That works well with devices such as automobiles that need high power surges for acceleration and hill climbing, but the average power demand is only a small fraction of the surge demand.

APPLICATIONS OF THE POWER SUPPLY

There are a tremendous number of practical applications for the present fuel cell power pack. The unique designs shown and described above have been targeted toward providing electrical power for cellular phones and portable radio transmitters and receivers. Those applications realize a substantial enhancement over rechargeable batteries by virtue of higher specific energy per unit mass of hydrocarbon fuels, such as methanol over nickel cadmium batteries, by factors in the range of 10 to 100 times. Logically almost all the portable electrically powered applications that are operated in human habitable conditions are integrated with the new fuel cell package. Limits are that the fuel cell costs scale with the maximum power output, and there needs to be a source of oxygen or other oxidizer. To preserve the fuel cells, until they are needed, it is as simple as sealing the fuel cell in an air tight container to deprive the fuel cells of oxygen. The new fuel cell invention has been described in the context of a hydrogen oxygen fuel cell but other variations of fuels and oxidizer sources, such as a hydrogen chlorine fuel cell are possible. The pore-free electrode helps considerably in blocking chlorine gas diffusion.

While the invention has been described with reference to specific embodiments, modifications and variations of the invention may be constructed without departing from the scope of the invention, which is defined in the following claims.

I claim:

1. A fuel cell apparatus comprising a central membrane having an oxygen side and a fuel side, electrodes positioned on the fuel side and on the oxygen side of the membrane, each electrode further comprising a first fuel catalyst film layer deposited on the central membrane, metal film layers deposited over the catalyst film layer, and hydrophobic film layers positioned on the metal film layers, an electrolyte disposed in voids between the catalyst film layer and the central membrane, a hydrogen permeable pore-free metal membrane interposed between the electrodes, the central membrane having a first water circulating, a fuel circulating and regulating membrane positioned above the electrode on the fuel side, a fuel channel flow manifold positioned above the first water circulating and regulating membrane and sealed to the electrode on the fuel side, a fuel inlet connected to the fuel manifold for delivering fuel to a region between the fuel manifold and the first water circulating and regulating membrane, a second water circulating and regulating membrane positioned below the electrode on the oxygen side, an oxidizer gas manifold positioned below the second water circulating and regulating membrane and sealed to the electrode on the oxygen side, and an oxidizer gas inlet connected to the oxidizer gas manifold for delivering oxidizer gas to a region between the oxidizer gas manifold and the second water circulating and regulating membrane, a first electrical contact connected to the hydrogen electrode and a second electrical contact connected to the oxygen electrode, and a sealing rim extending around and connected to outer edges of the cell.

2. The apparatus of claim 1, wherein the central membrane is a porous dielectric membrane.

3. The apparatus of claim 1, further comprising a fuel bottle attached to the fuel cell.

4. The apparatus of claim 1, further comprising a housing for enclosing the cell.

5. The apparatus of claim 1, further comprising an energy source attached to the electrodes for delivering electrical energy.

6. The apparatus of claim 5, wherein the energy source is voltage regulating electronics.

7. The apparatus of claim 5, wherein the energy source is a battery.

8. The apparatus of claim 1, wherein the central membrane is reinforced with fibers.

9. The apparatus of claim 1 wherein the central membrane comprises at least two membranes.

10. The apparatus of claim 3, wherein the fuel bottle comprises a needle insert for effecting a fuel connection with the fuel cell.

11. The apparatus of claim 3, further comprising an evaporative manifold for wicking out fuel from the fuel bottle to the evaporative manifold.

12. The apparatus of claim 4, further comprising the electrodes being on one side of the membrane, and a fold of the membrane is for forming the fuel side and the oxygen side and for positioning the electrodes opposite each other to form the fuel cell.

13. The apparatus of claim 12, further comprising an electrolyte and membranes interposed into the fold of the membrane.

14. The apparatus of claim 12, further comprising an electrolyte interposed into the fold of the membrane.

15. The apparatus of claim 12, further comprising membranes interposed into the fold of the membrane.

16. The apparatus of claim 2, further comprising microscopic geometry on the porous dielectric substrate membrane for enhancing electrolyte properties.

17. The apparatus of claim 1 further comprising additional members interposed in the electrolyte for selectively blocking different molecular species over ion transport based on geometrical designs or chemical properties of the species.

18. The apparatus of claim 1, wherein the fuel is a hydrogen bearing compound.

19. The apparatus of claim 1, wherein the fuel is a hydrogen bearing compound used electrocatalytically by the fuel cell electrodes.

20. The apparatus of claim 18, wherein the fuel is reformed before reaching the fuel cell electrodes.

21. The apparatus of claim 1, wherein the hydrogen permeable pore-free metal membrane interposed between the fuel and oxygen electrodes is electrically connected to the fuel electrodes.

22. The apparatus of claim 1, wherein the hydrogen permeable pore-free metal membrane interposed between the fuel and oxygen electrodes is electrically connected to the oxidizer electrodes.

23. The apparatus of claim 1, further comprising the electrodes having multiple electrode and electrolyte layers on a porous substrate.

24. The apparatus of claim 1, further comprising deposits on surfaces of the films for cell electrical separations.

25. The apparatus of claim 24, wherein the deposits comprise ink jet printing deposits.

26. The apparatus of claim 24, wherein the deposits comprise paints.

27. The apparatus of claim 24, wherein the deposits comprise vapors deposited by a method selected from a group comprising chemical vapor deposition, photolithography, vacuum deposition or electrochemical deposition.

28. The apparatus of claim 1, further comprising voltage regulation electronics electrically connected to the fuel cell for pulse cleaning of the electrodes, for maintaining performance of the fuel cell, and for changing voltages in the same or opposite polarity of the fuel cell.

29. The apparatus of claim 1, further comprising the fuel cell having a profile to fit into batteries and electrical profiles for matching existing uses of batteries.

30. The apparatus of claim 1, wherein the fuel cell is a thin bag having fuel on an inside and air on an outside.

31. The apparatus of claim 30, further comprising a backing membrane on the bag for allowing exhaust gases diffuse out and retaining the fuel gases.

32. The apparatus of claim 1, wherein the fuel cell comprises at least two back to back fuel cell assemblies.

33. The apparatus of claim 2, wherein the fuel bottle is a replaceable sealed ampoule of fuel.

34. The apparatus of claim 2, further comprising electronics connected to the fuel cell for regulating a voltage and a current output of the fuel cell to produce desired voltage and current characteristics, including alternating current, arbitrary wave functions, and steady voltage.

35. The apparatus of claim 1, further comprising at least two different electrolytes separated by the pore-free metal membrane.

36. The apparatus of claim 1, wherein the pore-free metal membrane comprises at least one film of a material deposited on a porous substrate for plugging the pores of the substrate.

37. The apparatus of claim 1, wherein the at least one film contains at least one transition element from the periodic table of elements.

38. The apparatus of claim 1, further comprising at least two electrodes forming the fuel electrode, each comprising a base electrode and a surface replica electrode, with the electrode being formed by deposition techniques of sputtering, vacuum evaporation, powder ink spraying, xerography, low pressure gas vapor deposition, chemical vapor deposition, electroplating, photolithography, or co-deposited materials.

39. The apparatus of claim 1, wherein the fuel cell is adapted to drive electronics goods.

40. The apparatus of claim 39, wherein the electronics goods is selected from a group consisting of cellular phones, portable radios, portable computers, pagers, portable audio equipment, hearing aids, medical equipment, or portable electronics.

41. The apparatus of claim 36, wherein the porous substrate material has a porosity collimated perpendicular to a plane of the material by use of drawing inks and solvents vertically, into the material rather than lateral blotting.

42. The apparatus of claim 41, wherein the material having ink are powders in a solvent.

43. The apparatus of claim 41, wherein the material comprises substances that change to electrode films after being delivered to the substrate.

44. The apparatus of claim 1, wherein the electrolyte is collimated for preventing lateral conduction through the electrolyte and preventing electrical shorting.

45. The apparatus of claim 1, wherein the fuel cells comprise side by side non-bipolar fuel cell series cells on a single membrane having different potentials.

46. The apparatus of claim 45, wherein the electrolyte is collimated for confining the pore-free membrane pinhole defect leaks from laterally affecting fuel cell electrode performance.

47. The apparatus of claim 1, further comprising a water and heat counter flow heat exchanger for humidifying and heating air entering the fuel cell.

48. The apparatus of claim 1, wherein the electrodes have tapered thickness for optimizing use of a bulk conductor metal.

49. The apparatus of claim 1, further comprising a wick for wicking liquid fuel out of the fuel tank, vaporizing fuel from the wick and condensing fuel on the fuel cell.

50. The apparatus of claim 1, wherein the fuel comprises a stoichiometric mixture of water and hydrocarbon for direct hydrocarbon electrocatalyst oxidation and for liberation of hydrogen to the fuel cell.

51. The apparatus of claim 31, wherein the fuel comprises a 1:1 molar mixture of methanol and water, and wherein exhaust carbon dioxide product exits as a gas through a membrane permeable to carbon dioxide and impermeable to methanol and water.

52. The apparatus of claim 1, further comprising a selectively permeable membrane proximal to the fuel cell electrode for excluding selected molecular species and allowing others to pass through.

53. The apparatus of claim 1, further comprising a selectively permeable membrane formed as part of the gas manifold for excluding selected molecular species and allowing others to pass through.

* * * * *